United States Patent [19]

Renoulin et al.

[11] Patent Number: 4,549,291
[45] Date of Patent: Oct. 22, 1985

[54] HYBRID LOCAL COMMUNICATION NETWORK, OPERATING BOTH IN CIRCUIT AND PACKET MODES

[76] Inventors: Roger J. Renoulin, 29, rue René Jean Magneux, Thorigné-sur-Vilaine, 35510 Cesson Sévigné; Jean P. Lefranc, 18, rue de Brest, Apt. B 234; Tahar Takhedmit, 12, rue Saint Yves, both of 35000 Rennes, all of France

[21] Appl. No.: 531,168

[22] Filed: Sep. 9, 1983

[30] Foreign Application Priority Data

Sep. 24, 1982 [FR] France ............................. 82 16632

[51] Int. Cl.4 ......................... H04J 11/04; H04J 3/00
[52] U.S. Cl. ........................................ 370/89; 370/86
[58] Field of Search ....................... 370/86, 60, 94, 89

[56] References Cited

U.S. PATENT DOCUMENTS 4,078,228  3/1978  Miyazaki ............................. 370/86

FOREIGN PATENT DOCUMENTS 0054077  6/1982  European Pat. Off. .
2406916  5/1979  France .

OTHER PUBLICATIONS

International Symposium on Subscriber Loops & Services, Sep. 20-24, 1982, (Toronto, Canada).
National Telecommunications Conference, vol. 3, Nov. 27-29, 1979, (New York City, New York).
International Conference on Communications, vol. 2, Jun. 4-7, 1978, (Toronto, Canada).
National Telecommunications Conference, vol. 2, Dec. 1-3, 1975, (New York City, New York).
IEEE, vol. 66, No. 11, Nov 1978, pp. 1497-1517, An Experimental Distributed Switching System to Handle Burst Computer Traffic, by: W. D. Farmer, et al.
Local Computer Networks, "A Local-Area Communication Network Based on a Reliable Token-Ring System", by: Bux, et al. (1982).
Computer Design, vol. 15, No. 6, pp. 83-88, Jun. 1976, "Pacuit Switching Combines Two Techniques in One Network", Smet, et al.

Primary Examiner—Douglas W. Olms
Assistant Examiner—Frank M. Scutch, III

[57] ABSTRACT

A hybrid local communication network operates both in circuit and packet modes with a loop carrying a TDM multiplex for interconnecting a number of terminals connected to the loop. The communications in a packet mode are controlled by a token. The header of each packet comprises the address of the called station and the address of the calling station. The TDM multiplex is arranged in multiframes comprising N frames O—(N−1). Each frame comprises P byte time slots iT0−iT(P−1) for transmitting a packet per frame. The byte time slot iT0 in each frame contains the frame alignment pattern of the frame, the byte time slot iT1 contains the frame packet token byte, the byte time slots iT2−iTh contain the packet header, the byte time slots iT(h+1)−iTx contain the useful data of the packet, and the byte time slot iT(x+1)−iT (P−1) contain circuit type communication data. The service and supervision messages between any of the units, on one hand, and the loop control unit, on the other hand, are exchanged in packet mode. The digital value of x may be changed by the loop control unit which then transmits the value of x in a packet mode to every operative unit. The consecutive frames in a dialogue in packet mode between two units are used alternately by those control units involved in the dialogue, the time interval iTx of each frame being allotted to the acknowledgment transmitted by one control unit to the other control unit relating to the packet the one control unit received in the preceding frame.

42 Claims, 14 Drawing Figures

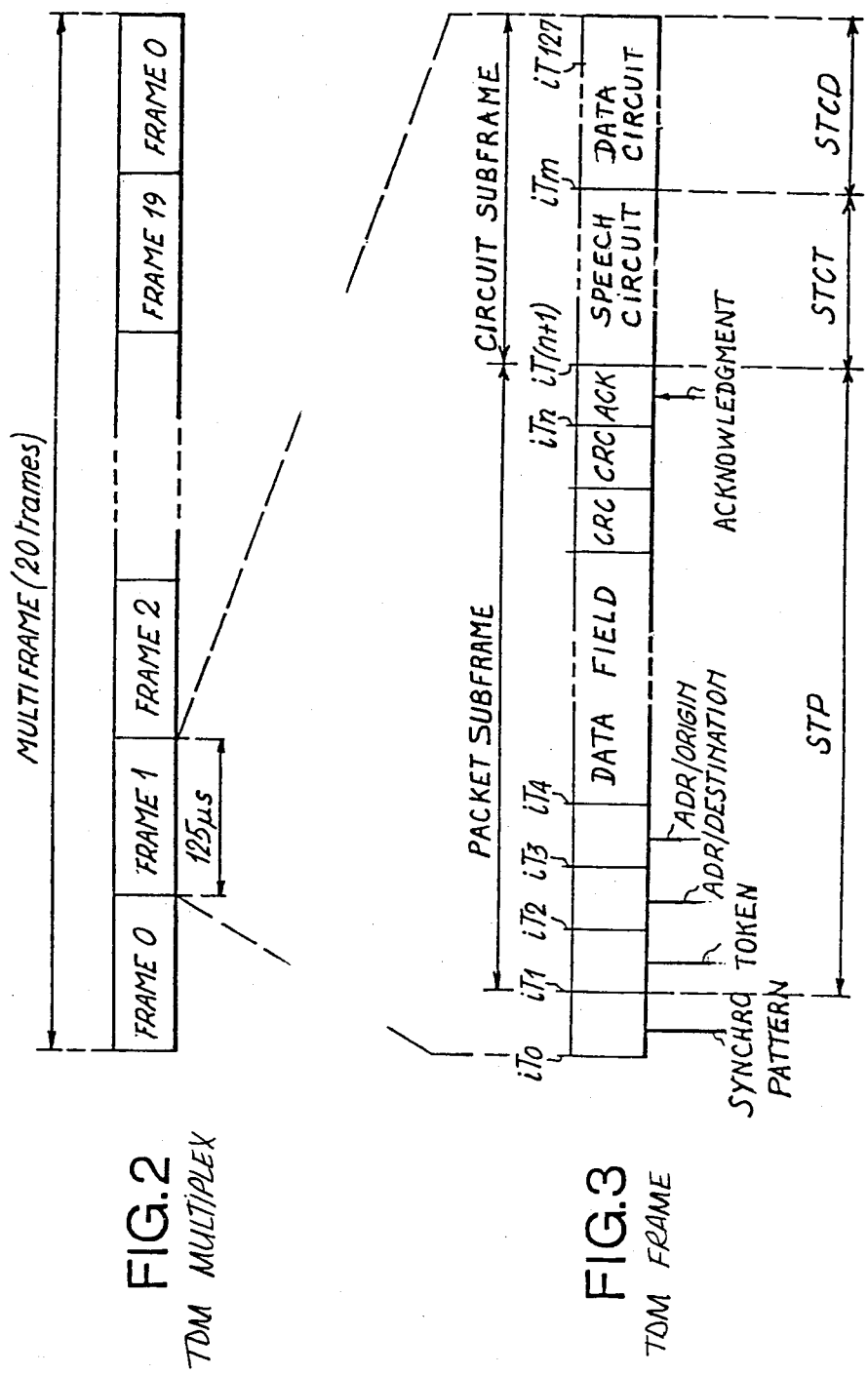
FIG.2 TDM MULTIPLEX
FIG.3 TDM FRAME

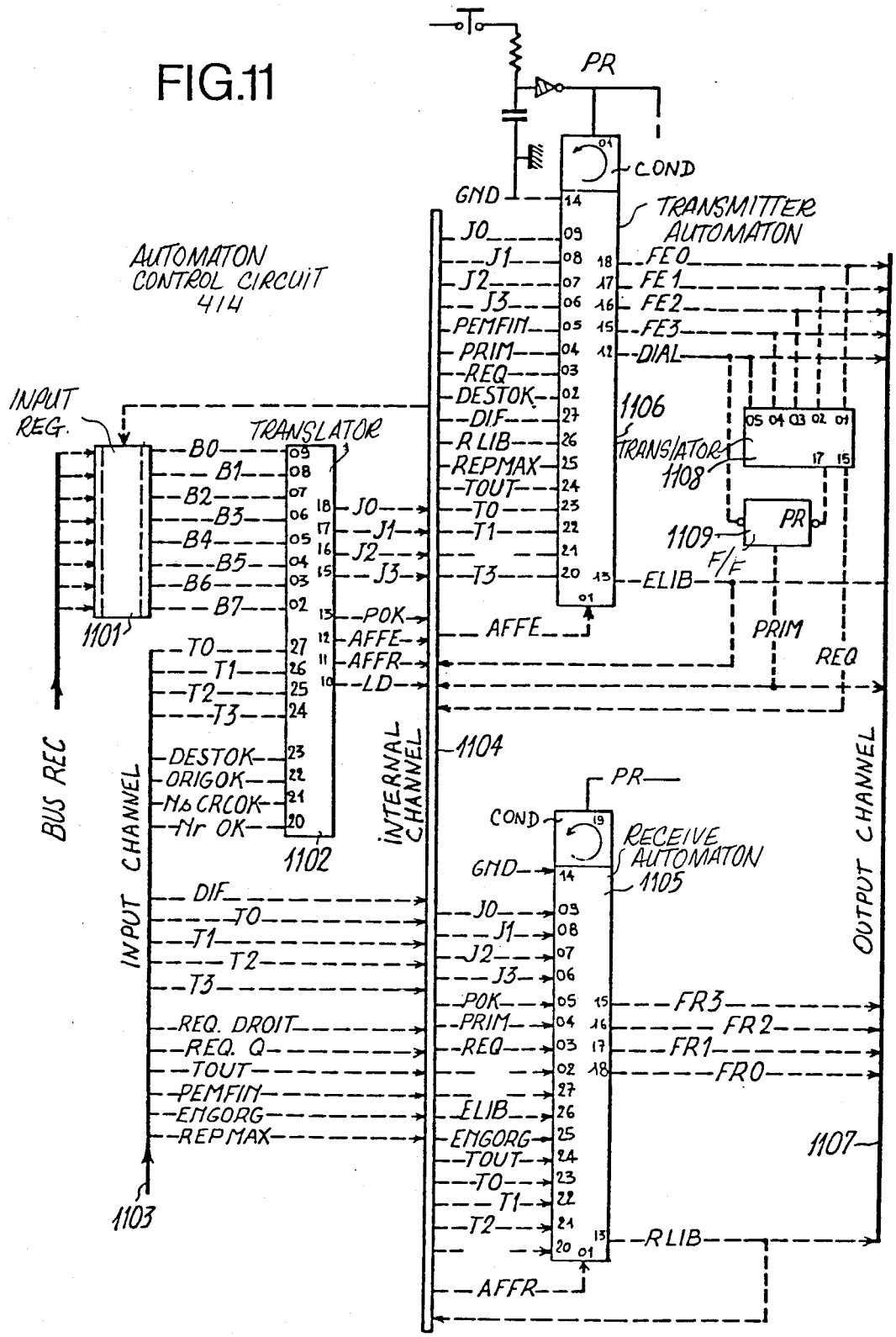

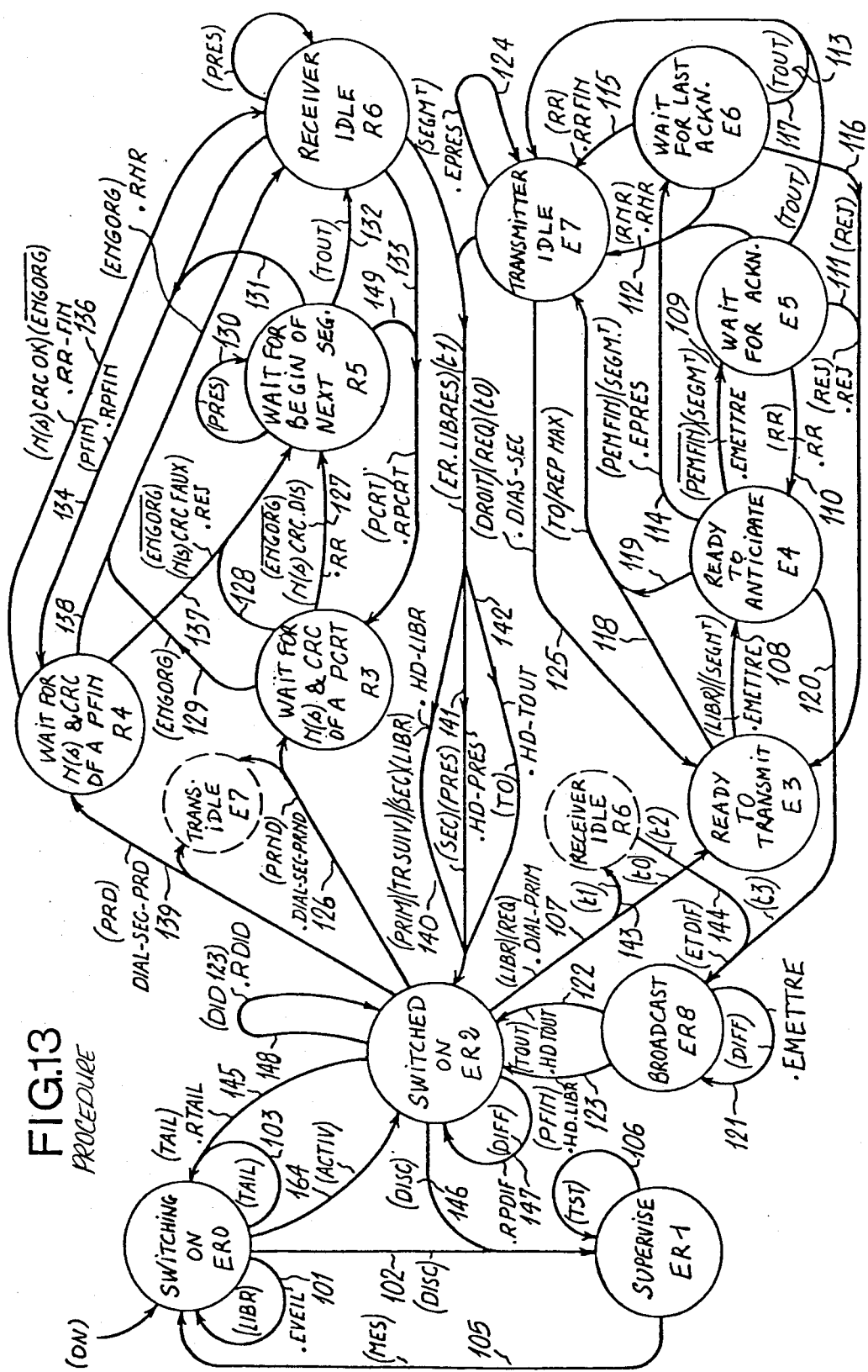

HYBRID LOCAL COMMUNICATION NETWORK, OPERATING BOTH IN CIRCUIT AND PACKET MODES

The present invention relates to a hybrid local communication network, operating both in circuit and packet modes, utilizing between local synchronous terminals a loop carrying a time division multiplex, the communications in packet mode being controlled by a token.

BACKGROUND OF THE INVENTION

Looped local networks are, for instance, described in the following technical papers:
(1) "An Introduction to Local Area Networks" by David D. Clark & al, published in the "Proceedings of the IEEE", Vol. 66, No. 11, November 1978, pages 1499 and 1500,
(2) "An experimental distributed switching system to handle bursty computer traffic" by W. D. Farmer and E. E. Newhall, published in "Pro. ACM Symposium on Problems in the Optimization of Data Communications", October 1963, pages 31–34, and
(3) "A local-area communication network based on a reliable token-ring system" by W. Bux & al, in "Local Computer Networks", IFIP, 1982, pages 69–82.

Token control of communications in packet mode is also known and described, for instance, in the above mentioned papers (1) and (2).

On the other hand, a communication network between terminals in a data processing system operating in packet mode within a time division multiplex is described in the European Pat. No. 0,036,808 (corresponding to the U.S. patent application Ser. No. 244,170, now U.S. Pat. No. 4,413,338).

It will be recalled that in the following the term "first order multiplex" is more particularly related to a 32-channel TDM multiplex. Such a first order multiplex is described in the booklet published on Sept. 20, 1973, by the "Conférence Européenne des administrations des Postes et Télécommunications", and entitled: Specifications of first order PCM multiplex system". But, it will be understood that nearly related first order multiplex, such as the 24-channel first order multiplex standardized in the USA, may also be used in the network according to the invention.

Each frame of a 32-channel first order multiplex has a duration of 125 microseconds and comprises 32 channel time slots iT0–iT31. Each channel time slot comprises 8 time slot w1–w8, each time slot being used for transmitting a bit 1 or 0. In each frame, the time slot iT0 is assigned to the frame alignment. When channel associated signalling is used in such a multiplex, the frames are grouped in multiframes of sixteen consecutive frames 0–15 each, and the multiframe alignment signal is 0000, that signal occupying the first four time slots w1–w4 of channel time slot iT16 in frame 0. Furthermore, channel time slot iT16 in each frame is used for transmitting the channel associated signalling. The other channel time slots iT1–iT15 and iT17–iT31 are used for usually transmitting the allotted speech samples.

An other multiframe structure is described in the above mentioned European Pat. No. 0,036,808. Each multiframe comprises 20 first order multiplex frames. In each frame, the channel time slot iT0 normally contains the frame synchronization information. In each multiframe, channel time slots iT16 in frames 1–19 are assigned to service information exchanges. In each frame, channel time slots iT1–iT15 and iT17–iT31 are allotted to data exchanges. Thus, the signalling messages for establishing and interrupting a communication, for supervising the system, and so on, which are transmitted through the service channel corresponding to the channel time slot iT16 in each frame, may be varied in size. The choice of a 20-frame multiframe makes available a multiframe alignment used to justify the flow of signalling messages with respect to the frame 0 as far as request messages are transmitted from the control unit toward the access equipments, and with respect to the frame 10 as far as response messages are transmitted from the access equipments toward the control unit. Furthermore, that choice of 20 frames per multiframe makes it possible to multiplex 2400-baud channels, or of course 1200-baud channels, while allowing to transmit a maximum flow of 64 kbit/s, with 48 useful kbit/s to make the network compatible with the envelopes defined in the CCITT ×50 recommendation. At last, the exchange of signalling messages allows to allot, in each multiframe, the frame(s) and the iT of said frame(s) wherein the information relative to one communication direction is placed.

FIELD AND SUMMARY OF THE INVENTION

A purpose of the present invention is to provide a communication network with a multiframe TDM multiplex, which can operate as well in circuit mode, as the one described in the above-mentioned European Pat. No. 0,036,808, as in packet mode with token control.

The hybrid network according to this invention is advantageous in that it can adapt the transmission resource constituted by the TDM multiplex to the transmission of messages and, in particular, of sporadic messages.

The frames in the network according to this invention have not the same duration as in standardized first order multiplex frames, but have for instance a duration of 125 microseconds and are divided into 128 byte time slots, which thus are shorter than the standard channel time slots.

According to a feature of the invention, a hybrid local communication network is provided which operates both in circuit and packet modes with a loop carrying a TDM multiplex for interconnecting a number of terminals connected to the loop, the communications in packet mode being controlled by a token, the header of each packet comprising the address of the called station and the address of the calling station, wherein the TDM muliplex is arranged in multiframes comprising M frames 0–(M−1), each frame comprising P byte time slots iT0–iT(P−1) for transmitting a packet per frame, the byte time slot iT0 in each frame containing the frame alignment pattern of the frame, the byte time slot iT1 containing the frame packet token byte, the byte time slots iT2–iTh containing the packet header, the byte time slots iT(h+1)–iTx containing the useful data of said packet, and the byte time slot iT(x+1)–iT P−1) containing circuit type communication data.

According to another feature of the invention, the hybrid local communication network comprises cluster control units, each acting as interface circuits between a cluster of different types of terminals and the loop, and a loop control unit, the service and supervision messages between any of the cluster control units, on one hand, and the loop control unit, on the other hand, being exchanged in packet mode.

According to another feature of the invention, the digital value of x may be changed by the loop control unit which then transmits the new value of x in packet mode to every operative cluster control unit.

According to another feature of the invention, the consecutive frames in a dialogue in packet mode between two control units are used in alternance by those control units involved in the dialogue, the time interval iTx of each frame being allotted to the acknowledgement transmitted by one control unit to the other control unit relating to the packet the one control unit received in the preceding frame.

According to another feature of the invention, each cluster control unit becoming operative in the loop transmits a message in packet mode relating to its operative condition to the loop control unit which in turn transmits in packet mode to the newly operative cluster control unit, a message containing the digital value of x and other service parameters, if any.

Typical combinations of means for reaching the purpose of this invention and for reducing the invention to practice according to above mentioned features will appear from the following description and the attached claims.

BRIEF DESCRIPTION OF THE DRAWINGS

The above mentioned features of the present invention, as well as others, will appear more clearly from the following description of an embodiment, the said description being made in conjunction with the accompanying drawings, wherein:

FIGS. 2 and 3 are time-diagrams illustrating the use of a TDM multiplex according to this invention, FIG. 11 is a simplified block-diagram of the automaton circuit of the unit UCG shown in FIG. 4, FIG. 13 is a diagram illustrating the operation of the automaton circuit shown in FIG. 11.

DESCRIPTION OF THE PREFERRED EMBODIMENT

Figure 1:
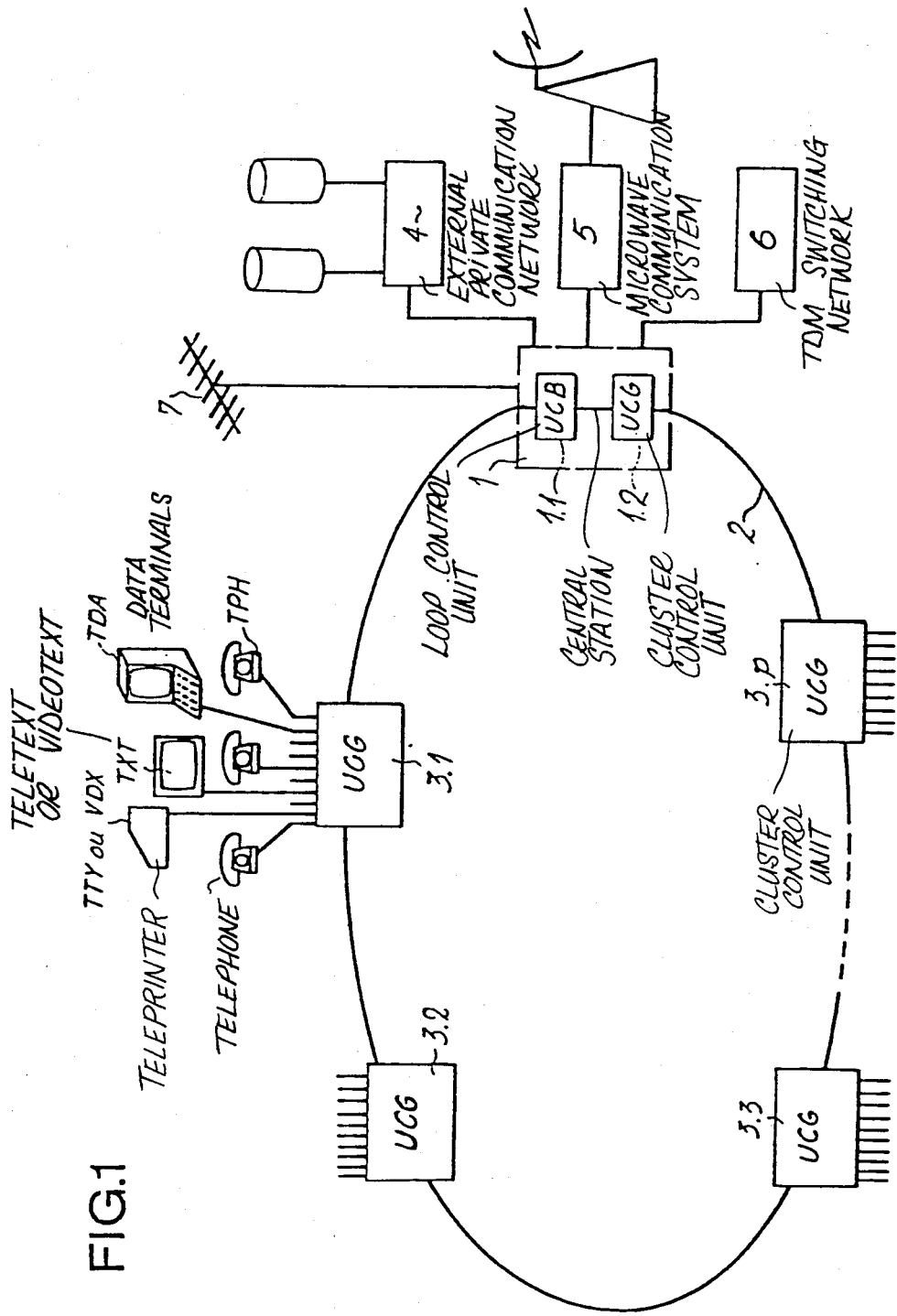
FIG. 1 is a schematic block-diagram of a hybrid local communication network according to this invention.

With reference to FIG. 1, a network according to the invention is shown, which comprises a control central station 1 connected to a plurality of secondary stations 3.1 to 3.p over a loop 2 transmitting aTDM multiplex, each secondary station serving a cluster of terminals. Each secondary station in connected to one or more terminals, i.e. telephones TPH, teleprinters TTY, teletext (TXT) or videotex (VDX) receiver sets, data terminals TDA, . . . , the operating characteristics being of course different from a terminal to another one.

Furthermore, the central station 1 is assumed to be connected to a plurality of external private or public communication networks, such as a TRANSPAC network 4, a TRANSMIC network 5, a TDM telephone switching network 6 and a television receiving antenna 7. Thus, the local network according to this invention allows to establish the communications between the terminals served by the secondary stations 3.1–3.p, or between any such terminal and terminals outside of the local network through the central station. For reasons which will be detailed in the following, the control central station 1 comprises two couplers 1.1 and 1.2 giving access to the loop 2. In particular, the coupler 1.1 contains a loop control unit UCB which controls cluster control units UCG in secondary stations or couplers 3.1–3.p, and particularly transmits signalling to them. The coupler 1.2 contains a cluster control unit UCG and performs the processing of the communications between the loop stations and the outside networks 4–7.

In FIG. 2, a timing diagram of the TDM multiplex is shown which is used in the network shown in FIG. 1. A multiframe includes 20 frames 0–19. The duration of each of the frames 0–19 is of 125 microseconds and is divided into 128 byte time slots iT0–iT127. The allotment of an iT having a predetermined place in each frame constitutes a 64 kbit/s channel, which allows the transmission of a telephone call. The frames are arranged in multiframes of 20 frames each, so allowing to provide 2400 bit/s, 4800 bit/s, . . . channels, in conformity with the standard ×50, by assigning to such a channel either one, or two, . . . iTs in each multiframe. However, as it will appear in the following, the structure of each frame allows also to transmit data in packet mode.

The synchronization of that multiplex is insured by a synchronization byte carried by the iT0 in each frame. In the described embodiment, the structure of the iT0 of the even frames in the superframe is in fact the one of a synchronization byte, while the iT0 of the odd frames contains an byte corresponding to the number of that frame. Therefore, the iT0 in the even frames allows to count them and derive the superframe synchronization therefrom.

In practice, each frame is divided into three consecutive subframes; the first subframe STP comprises the time intervals iT1–iT(n+1) and is assigned to the communications in packet mode; the second subframe STCT comprises the time intervals iT(n+2)–iTm and is assigned to the telephone communications; the third subframe STCD comprises the time intervals iT(m+1)–iT127 and is assigned to the transmission od the data in circuit mode.

Generally, in the described embodiment, the telephone communications transmitted in the subframe STCT and the data communications transmitted in the subframe STCD, in circuit mode, are processed as described in the European Pat. No. 0,036,808, except with respect to signalling and supervision. In fact and as it will appear in the following, all the signalling and supervision messages are processed as communications in packet mode transmitted within the subframe STP, those messages being transmitted from unit UCG 1.2 or units 3.1–3.n, to the unit UCB 1.1, or reversely. In each communication in circuit mode, the allocation of a time interval iTx and, possibly, a number of frames to a communication is managed by the management central unit of the central station 1. The chart of the various allocations is therefore stored in the management central unit.

Referring now to FIG. 3, a subframe STP comprises:
iT1 which contains the token byte, of which all the uses, as expected in the network according to the invention, will be described in the following,
iT2 of which the octet identifies the address of the packet addressed station in the network loop,
iT3 of which the byte identifies the address of the packet addressing station in the network loop,
byte time slots iT4–iT(n−3) which contain the useful packet data or the useful packet segment data transmitted in the involved subframe STP
byte time slots iT(n−2) and iT(n−1) of which the bytes transmit the frame control sequence, here the subframe control sequence, i.e. the CRC in conformity with the CCITT recommendation V41, and
iTn which contains an acknowledgment byte transmitted by the addressee station.

It appears that byte time slot iT1–iT4 constitute a packet header following the synchronizing signal in iT0. The header pattern is thus identical to the one described in the U.S. Pat. No. 4,058,830 which is now well known as the data broadcasting system DIDON (such a system being particularly used for broadcasting the teletext system ANTIOPE). It will appear in the following how that structure will be used in the network of the invention for broadcasting data.

In the frame shown in FIG. 3, and according to the invention, the distribution between the three subframes STP, STCT and STCD is dynamically variable. Concretely, the values of n and m are determined by the central control station 1. For m, as hereabove mentioned, the allocation of the communications in circuit mode is controlled by the loop control unit UCB in station 1, which makes a simple internal rearrangement when m is changed, without having to inform the secondary stations thereof. On the contraty, as the value n defines the maximum size of a packet to be inserted in a frame, the control of change regarding n results in an information which has to be transmitted to every unit UCG from unit UCB. In practice, in the described embodiment, the information relating to n is a part of the content of the byte time slot iT1. Therefore, the network operation is highly flexible which allows to adjust the resource to the demands with respect to the traffics respectively expected for telephone communications, data in circuit mode and data in packet mode. Thus, for the busy hours in telephone traffic, the UCB will extend the subframe STCT while the other two will be shortened. On the contrary, for the hours of low telephone traffic rate, the UCB will extend the subframe STP while the other two will be shortened.

In practice, the size n of the packet subframe STP will not be selected lower than 32 in order to avoid that the header, plus the CRC, be too long with respect to the length of the useful packet data.

Also, in practice, the size of the packet subframe STP will be selected amongst a limited number of formats, such as 32k, wherein k is an integer equal to either 1, 2 or 3. Therefore, three patterns of iT1, or otherwise said, three tokens are used to define n. In the following, those three tokens are called "TAIL 32", "TAIL 64" and "TAIL 96".

To be noted that for lengthening subframe STP withour interrupting the circuit type communications, it is assumed that the program of the loop control unit UCB in the central station 1 is able, before changing the limit iTn, to select iT beyond the newly selected byte time slot iTn for establishing new circuit communications and, if necessary, to rearrange the already allotted iTs for suppressing those iTs that would have remained inside the new limit iTn.

It has been hereabove mentioned that the minimum size of the subframe STP is 32 iT for the useful information. Now the data blocks to be transmitted in packet mode are generally more important, and, therefore, the units UCB and UCG cut each packet to be transmitted in the subframes STP of the consecutive multiplex frames in the described embodiment. Thus, there are four types of packet segments: in a message comprising several segments, the segment constituting the beginning of the block or message is called "start segment"; intermediary segments are called "current segments", the segment constituting the end of the block is called "end segment", and, in the case of a short message comprising only one segment, such a segment is called "single segment".

These four types of segment are identified by four different tokens, respectively "PRND", "PCRT", "PFIN", "PRD". The table IV provides a list of the tokens which are used in the described embodiment, their meanings being now given for a better understanding of the description.

The token "DISC" is a control token which is transmitted from the loop control unit UCB, located at the central point 1.1, for suspending the operation of a unit UCG in a secondary station. When addressed to a unit UCG, control token "DISC" switches that unit into supervision condition upon which only the unit UCB can act later on.

The token "TST" is a control token transmitted from the unit UCB to a unit UCG which has already been put in supervision condition, ordering that unit to initiate a test sequence so that the unit proves it can run.

The token "MES" is a control token transmitted from the unit UCB to a unit UCG which has already been put in supervision condition, authorizing that unit to switch to the "operative condition".

The hereabove mentioned tokens "TAIL32", "TAIL64" and "TAIL96" are control tokens which are transmitted from the unit UCB. When the size of the subframe STP is changed in normal operation, the unit UCB transmits the proper token to all the units UCG in operation. The unit UCB may also transmit the proper token to a unit UCG in order to inform it of the current size of the segment within the procedure following the switching on of that station. In such a case, the unit UCG to which the token is addressed sends the same back to the unit UCB which thus can verify that the parameters "size and speechright" have not to be impaired by the transmission and that it is really the concerned unit UCG which has returned it the token. In case a fault is noted, the transmission is repeated, allowing to detect an eventual defect in the concerned unit USG, and, in this case, the unit UCB can switch it into supervision condition in transmitting a token DISC.

The token "ACTIV" is a control token which is transmitted from the unit UCB to a unit UCG once the above mentioned loop access parameters has been transmitted and when unit UCB has ascertained that the unit UCG can take a part in the general activity. Thus, the token ACTIV is an authorization which switches the unit UCG into the operative condition so that the latter can start a dialogue.

The token "EVEIL" is a control token which is transmitted from a unit UCG when it is switched on. In fact, the procedure automatons of a unit UCG which will be described in details in the following are reset in condition 0 when they are switched on. In this condition, the unit UCG can recognize only the controls from the unit UCB and the token "LIBR" which indicates a loop access possibility. On the other hand, the unit UCG can transmit only in the header area since it does not know the current exchange parameters. Thus, as it recognizes the token LIBR, it changes it for the token EVEIL followed by the address of the unit UCB and by its own address for claiming entry in the general activity. To be noted that the unit UCG will have in fact a normal activity only when it has received the size parameters and the token ACTIV from the unit UCB.

The token "LIBR" is a real token which is transmitted from a unit UCG or UCB, after the transmission of the last packet segment, when the concerned unit has been a station called "primary station" in a packet communication. Thus, token LIBR indicates that the packet channel is free. Token LIBR is also transmitted when a predetermined timing has elapsed in the concerned unit.

The token "PRES" is also a real token which is transmitted from a unit UCG or UCB after the transmission of the last packet, when the unit UCG or UCB is a unit called "secondary station". The difference between a primary station and a secondary station will appear in the following. Token PRES transmitted from the secondary station is addressed to the primary station with which it is talking for allowing the primary station to go on with the dialogue in transmitting in turn.

The token "PRD", which is read "first-last", is transmitted from a unit UCG or UCB for indicating that the transmitted message comprises only one segment which is the segment transmitted within the rest of the subframe STP. At the beginning of the data field following the header, token PRD indicates that the first byte contains an information concerning the format, i.e. the length of the data field which may not fill the entire remaining part of the subframe STP. Token PRD initialize a dialogue.

The token "PRND", which is read "first-not last", is transmitted from a unit UCB or UCG for indicating that the message to be transmitted comprises more than one segment. Of course, the segment which follows PRND has a maximum size. Together with the above mentioned token PRD, token PRND is the only token which can initialize a dialogue. In other words, the segment number counters are reset when one of those two tokens is received.

The token "PCRT", which is read "current", is transmitted from a unit UCB or UCG for indicating that the next data field is neither the first, nor the last of the message. The segment which follows PCRT has a maximum size. In the data field which comes after, the first byte indicates the segment number.

The token "PFIN", which is read "last", is transmitted from a unit UCB or UCG for indicating that the following data field is the last segment of a message, being possible that the whole subframe STP is not fulfilled with that segment, so that the length of the segment is indicated in the first byte of the packet.

The token "DIFF" indicates that the message is transmitted to all the other units from a unit UCG or UCB. To be noted that, in the address byte of the addressee, a special further address is provided, which can be used by the unit UCB for transmitting a message to all the units UCG. Token DIFF does not call for a passage to dialogue, since no acknowledgment is expected.

Three tokens "DID1", "DID2" and "DID3" refer to transmitted type DIDON messages, i.e. to messages having the structure described in the U.S. Pat. No. 4,058,830. As previously, said tokens do not call for a passage to dialogue.

In Table IV, for each token, there is provided its configuration, the one of its complement, its enabling time T1, its value transcoded into a 4-bit word, and the value of that 4-bit word in hexadecimal code. The meaning of the time T1 will appear in the following.

The complement of each token is transmitted from the unit UCB for each segment passing through the loop, in place of the corresponding token. Therefore, each station must be able to assign the same meaning to a transcoded token and to its transcoded complement. Also, when the unit UCB detects a segment with complemented token, it derives there from that this segment has made more than one turn along the loop. In this case, it deletes it in transmitting a token LIBR instead. In fact, for some sort of reason, the segment has been subject to a transfer error, or the addressee station is not free. The segment would remain engaged through the loop if it was not suppressed by the unit UCB.

In table IV are also given the three types of response that the addressee UCG or UCB can insert in the time interval iTn (acknowledgment or AK byte), regarding its last four bits. Also, table IV shows that those responses are enabled at time T3 and they are also transcoded, their transcoded decimal value being also indicated. The first four bits of the AK byte contain the number of the segment to which the response corresponds.

The response "RR" is transmitted from the receiving unit of a segment when the latter is correct, once its frame control sequence and its order number have been verified.

The response "REJ" is transmitted from the receiving unit of a segment when the latter has not been found correct.

The response "RNR" is transmitted from the receiving unit of a segment when the station considers that its data receiving memory is not able to receive another segment.

In case of a transmitted message, indicated by one of the tokens DIFF, DID1, DID2 and DID3, none of those responses is transmitted from the receiving stations since they have not to acknowledge the receipt of such a message.

Now, as the different tokens and acknowledgments have been explained, it will be described how an active station in acitvity can, in a general manner, transmit a message in packet mode to another station on the loop, being known that each header is analysed in every unit UCG or UCB through which the frame passes.

It will be assumed that a message is to be transmitted by the unit of a station, i.e. that unit is in condition REQ, and has noted the presence of the token LIBR in the iT1 of the current frame; then, in the same iT1, that unit changes the token LIBR for the token PRD or PRND, followed by the address of the addressee in iT2, its own address in iT3, then by the text, and, at last, by the frame control sequence CRC. In that just engaged communication, this station has the status of "primary station", i.e. it turns to condition "PRIM". The next units note that the token in circulation is no longer the token LIBR and they compare their own address with the addressee's contained in the iT2. If the addresses are not coincident, each station opens an appropriate gate through which the received subframe STP is retransmitted through the loop without any modification. On the contrary, in case of coincidence, the addressed unit turns to condition "secondary" unit", i.e., it turns to "SEC".

When the secondary unit is in condition SEC and has received the first segment, after iT0, it changes the received subframe for the token PRES in iT1, the address of the primary unit in iT2, its own address in iT3, and it erases the remaining part of the subframe. Then, two cases may occur. The secondary unit has no message ready to be transmitted to the primary unit: after each segment, it sends the same message beginning with the token PRES, but, in the last byte of the subframe, it inserts the appropriate response either RR, REJ or RNR. The secondary unit has a waiting message for the primary unit: it sends successively the segments of its message, acting as a primary unit, except that in the last byte, it inserts the appropriate AK concerning the segments received from the primary unit. In this last case, the primary unit sets also in the last byte the adequate AK with respect to the segments received from the secondary unit.

In any case, only the primary station can effectively stop the dialogue by transmitting a token LIBR.

In the following tables, by way of examples, successive frames have been provided, which comprise the subframes STP, STCT and STCD, the subframes STP being detailed with respect to their headers, as well as the subframe control sequences and the acknowledgment or AK bytes exchanged in the course of several types of communication. In those tables, the indications PRIM or p (for primary) and SEC or s (for secondary) allow to recognize the origin of the segment; "forward" and "backward" correspond to the subframes transmitted from and received by the primary station; the following number is the number of the current segment; the origin of the frame control sequence is indicated by "p" or "s" placed after CRC, and the AK message is preceded by the number of the acknowledged segment and by "p" or "s" according to its origin. The address of the primary unit is referenced A, and the one of the secondary unit is referenced B. At last, the non-significative bytes are referenced X.

| | | | | | | | | | | |
|---|---|---|---|---|---|---|---|---|---|---|
| \multicolumn{11}{c}{Example I of communication} ||||||||||| 
| PRIM | forw 1 | PRND | B | A | 1 | ... | CRCp | X | STCT | STCD |
| SEC | backw 1 | PRES | A | B | X | ... | X | 1pRR | STCT | STCD |
| PRIM | forw 2 | PCRT | B | A | 2 | ... | CRCp | X | STCT | STCD |
| SEC | backw 2 | PRES | A | B | X | ... | X | 2pRR | STCT | STCD |
| PRIM | forw 3 | PCRT | B | A | 3 | ... | CRCp | X | STCT | STCD |
| SEC | backw 3 | PRES | A | B | X | ... | X | 3pRR | STCT | STCD |
| PRIM | forw j | PFIN | B | A | j | ... | CRCp | X | STCT | STCD |
| SEC | backw j | PRES | A | B | X | ... | X | jpRR | STCT | STCD |
| PRIM | | PRES | B | A | X | ... | X | X | STCT | STCD |
| SEC | | PRES | A | B | X | ... | X | X | STCT | STCD |
| PRIM | | LIBR | | | | ... | | | | |
| \multicolumn{11}{c}{Example II of communication} |||||||||||
| PRIM | forw 1 | PRND | B | A | 1 | ... | CRCp | X | STCT | STCD |
| SEC | backw 1 | PRES | A | B | X | ... | X | 1pRR | STCT | STCD |
| PRIM | forw 2 | PCRT | B | A | 2 | ... | CRCp | X | STCT | STCD |
| SEC | backw 2 | PRND | A | B | 1 | ... | CRCs | 2pRR | STCT | STCD |
| PRIM | forw 3 | PCRT | B | A | 3 | ... | CRCp | 1sRR | STCT | STCD |
| SEC | backw 3 | PCRT | A | B | 2 | ... | CRCs | 3pRR | STCT | STCD |
| PRIM | forw 4 | PCRT | B | A | 4 | ... | CRCp | 2sRR | STCT | STCD |
| SEC | backw 4 | PFIN | A | B | 3 | ... | CRCs | 4pRR | STCT | STCD |
| PRIM | forw 5 | PFIN | B | A | 5 | ... | CRCp | 3sRR | STCT | STCD |
| SEC | backw 5 | PRES | A | B | X | ... | X | 5pRR | STCT | STCD |
| PRIM | | PRES | B | A | X | ... | X | X | STCT | STCD |
| SEC | | PRES | A | B | X | ... | X | X | STCT | STCD |
| PRIM | | LIBR | | | | ... | | | | |
| \multicolumn{11}{c}{Example III of communication} |||||||||||
| PRIM | forw 1 | PRD | B | A | 1 | ... | CRCp | X | STCT | STCD |
| SEC | backw 1 | PRES | A | B | X | ... | X | 1pRR | STCT | STCD |
| PRIM | forw 2 | PRES | B | A | X | ... | X | X | STCT | STCD |
| SEC | backw 2 | PRND | A | B | 1 | ... | CRCs | X | STCT | STCD |
| PRIM | forw 3 | PRES | B | A | X | ... | X | 1sRR | STCT | STCD |
| SEC | backw 3 | PCRT | A | B | 2 | ... | CRCs | X | STCT | STCD |
| PRIM | forw 4 | PRES | B | A | X | ... | X | 2sRR | STCT | STCD |
| SEC | backw 4 | PCRT | A | B | 3 | ... | CRCs | X | STCT | STCD |
| PRIM | forw 5 | PRES | B | A | X | ... | X | 3sRR | STCT | STCD |
| SEC | backw j+1 | PFIN | A | B | j | ... | CRCs X | STCT | STCD | |
| PRIM | forw j+2 | PRES | B | A | X | ... | X | jsRR | STCT | STCD |
| SEC | backw j+2 | PRES | A | B | X | ... | X | X | STCT | STCD |
| PRIM | | LIBR | | | | ... | | | | |
| \multicolumn{11}{c}{Example IV of communication} |||||||||||
| PRIM | forw 1 | PRD | B | A | 1 | ... | CRCp | X | STCT | STCD |
| SEC | backw 1 | PRES | A | B | X | ... | X | REJ | STCT | STCD |
| PRIM | forw 2 | PRES | B | A | X | ... | X | X | STCT | STCD |
| SEC | backw 2 | PRES | A | B | X | ... | X | X | STCT | STCD |
| PRIM | forw 3 | PRD | B | A | 1 | ... | CRCp | X | STCT | STCD |
| SEC | backw 3 | PRES | A | B | X | ... | X | 1pRR | STCT | STCD |
| PRIM | | PRES | B | A | X | ... | X | X | STCT | STCD |
| SEC | | PRES | A | B | X | ... | X | X | STCT | STCD |
| PRIM | | LIBR | | | | ... | | | | |

-continued

| | | Example V of communication | | | | | | | | |
|---|---|---|---|---|---|---|---|---|---|---|
| PRIM | forw 1 | PRND | B | A | 1 | ... | CRCp | X | STCT | STCD |
| SEC | backw 1 | PRES | A | B | X | ... | X | RNR | STCT | STCD |
| PRIM | forw 2 | PRCT | B | A | 2 | ... | CRCp | X | STCT | STCD |
| SEC | backw 1 | PRES | A | B | X | ... | X | X | STCT | STCD |
| PRIM | | LIBR | | | | ... | | | | |

In the first example, only the primary unit is transmitting. In the example II, both the units are transmitting, but the message transmitted by A is longer than the one transmitted by B. In the example III, the unit B transmits a message longer than the one transmitted by unit A. In the communication of the example IV, a segment has been rejected, and the one of the example V, the unit B is congested.

Because only the primary station can release the loop, the various units get one after the other the right to transmit in the direction of the loop. On the other hand, if the number of communications a unit can initiate each time it recognizes a token LIBR is limited, it appears that the procedure allows to insure a certain recurrence of the speechright and the equality between the stations. At last, the number of segments a unit can transmit in a communication is also limited to a maximum value, so that the time a unit can busy the loop is limited.

Also, the example IV shows that a communication can have its duration extended by the transmission errors which involve the repetition of segments. Therefore, the number of repetitions is also limited to a maximum value REPMAX, and, when that value is reached, the concerned unit stops its transmission, a token LIBR being then transmitted by a primary unit and a token PRES by a secondary unit. However, it must be noted that because the number of errors must be limited, the repeated segments are not deducted from the maximum number of segments a unit can transmit during a communication.

For each received message containing a useful information, apart from the header, the duration of the two subframes STCT and STCD which follow STP allows to calculate RR or REJ. In the above examples, it has been assumed that the last transmitted useful packet should be acknowledged, so that there are two packets with the token PRES before the communication is released. The system can also operate without acknowledging the last eackets with the tokens PFIN or PRD.

Figure 4:
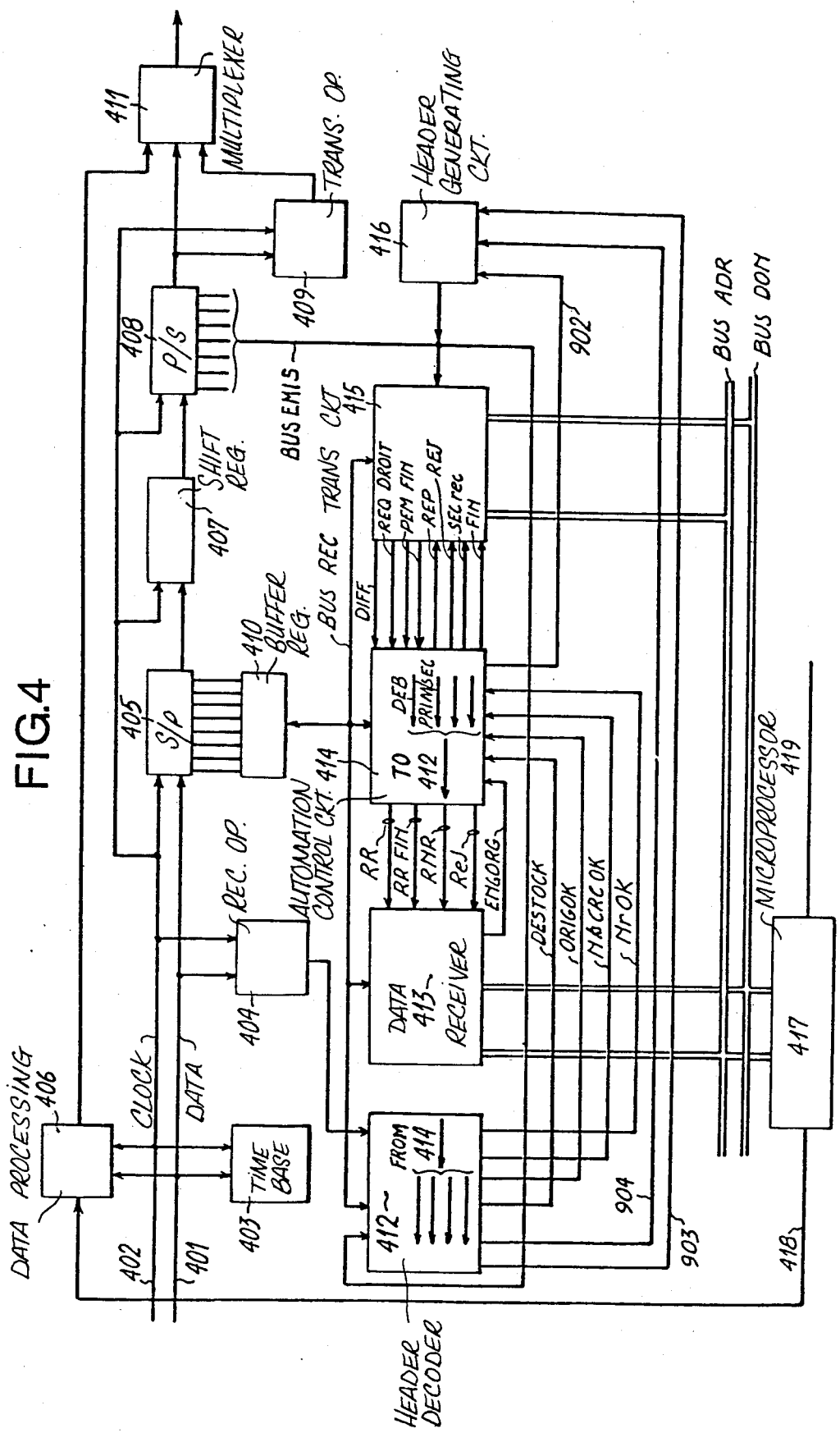
FIG. 4 is a block-diagram of a cluster control unit UCG.
Figure 9:
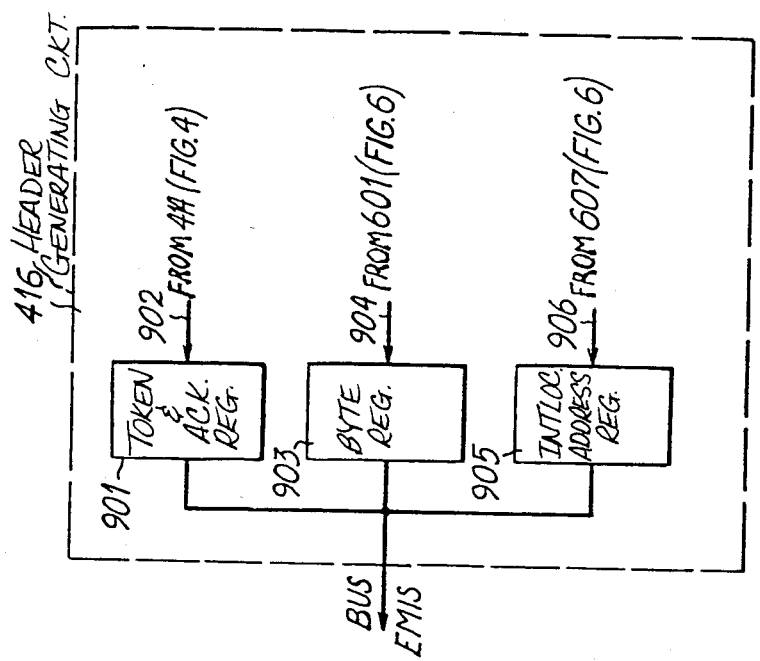
FIG. 9 is a block-diagram of the header generator circuit of the unit UCG shown in FIG. 4.

In the block-diagram of a unit UCG shown in FIG. 4, the received data bits are serially transmitted through the wire 401, and the bit clock signal is transmitted through the wire 402. The wire 401 is connected to the input of a time base circuit 403, the input of a receiving CRC operator 404, the input of a series/parallel converter 405 and the input of a data processing circuit 406. The bit clock wire 402 is connected to the clock inputs of the time base 403, the receiving CRC operator CRC 404, the series/parallel converter 405, a shift register 407, a parallel/series converter 408, and a transmitting operator CRC 409.

In practice, the circuits 405, 407 and 408 are shift registers with a capacity equal to one byte. In addition to its series output, the register 405 has a parallel output which allows it to operate as a parallel/series converter. The series output of the register 405 is connected to the series input of the register 407, of which the series output is connected to the series input of the register 408. The parallel output of the register 405 is connected to the input of a buffer register 410 which has the function of storing a received byte during the time the next byte is received. The data input of the register 408 is connected to the data input of the transmitting CRC operator 409, on one hand, and, on the other hand, to an input of a multiplexer 411 which has three data inputs. An other input of the multiplexer 411 is connected from the output of the transmitting operator CRC 409.

The output of the register 410 is connected to a receiving bus REC to which are connected a header decoding circuit 412, a data receiving circuit 413, a control circuit 414 and a transmitting circuit 415. The control circuit 414 is in the form of a procedure automaton, and it will be equally called "control circuit" or "automaton" in the following. The output of the receiving CRC operator 404 is connected to the header decoding circuit 412. The data output of the transmitting circuit 415 is connected to the transmitting bus EMIS which is also connected to an input of the decoding circuit 412 and from the output of a heading generating circuit 416.

The receiving circuit 413 is connected to the address bus BUS ADR and the data bus BUS DON of a microprocessor 417. The address bus BUS ADR and the data bus BUS DON are connected to the transmitting circuit 415. The microprocessor 417 is also connected to the circuit data processing circuit 406, through a data link 418 and the packet data terminals served by the unit UCB, through a second data link 419.

Figure 5:
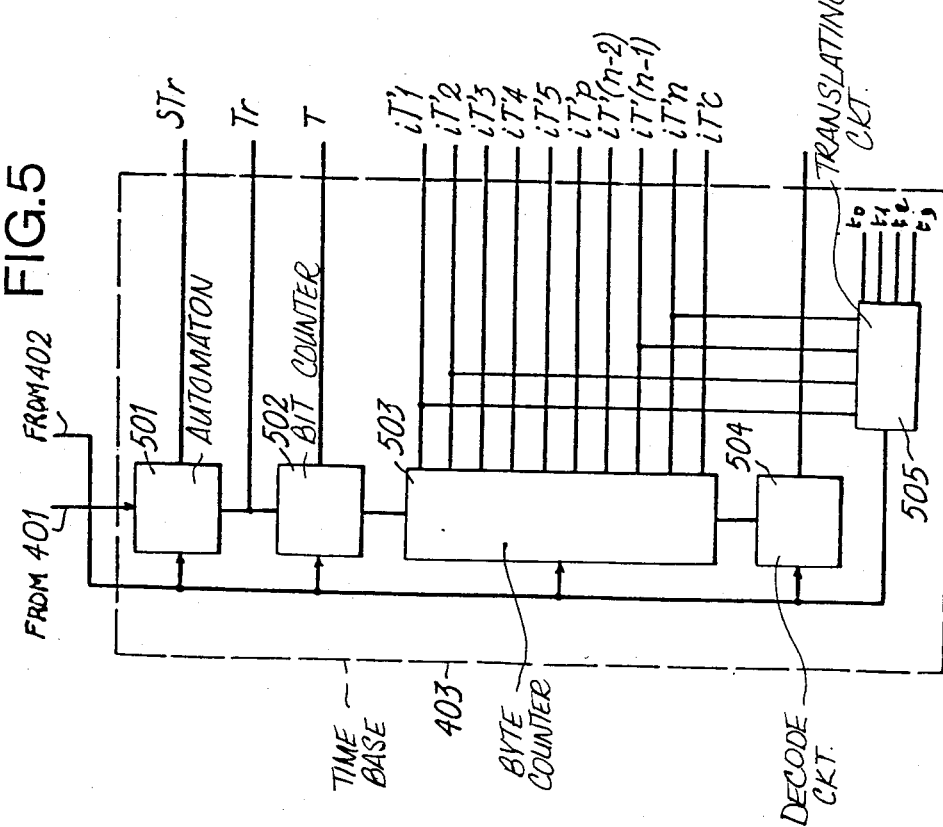
FIG. 5 is a block-diagram of the time base circuit of the unit UCG shown in FIG. 4.

An embodiment of a time base circuit 403 is shown in FIG. 5. In circuit 403, the wire 401 is connected to the input of a synchronization automaton 501 of which an output is connected to a bit counter 502; an output of the counter 502 is connected to the input of a byte counter 503 of which the output is connected to a frame order decoding circuit 504. The clock inputs of the circuits 501 to 504 are connected from the wire 402. The counter 502 is also connected to a translating circuit 505.

The synchronization automaton 501 is of the previously mentioned type PAL, its function being to recognize the frame and superframe synchronizing signals. One output Tr of automaton 501 supplies the frame alignment signal to counter 502 and a second output STr supplies the superframe alignment signal. The outputs Tr and STr are connected to the circuit data processing circuit 406.

The bit counter 502 supplies every eighth bit a signal to the byte counter 503. The parallel outputs of the counter 503 supply the time slots iT'1, iT'2, iT'3, iT'4, iT'5, iT'p, iT'(n−2), iT'(n−1), iT'n, iT'C. The output iT'p is enabled when one of the stages 5-(n−3) of 503 is active, and the output iT'C is enabled for the whole remaining part of the frame following the time slot iT'n. In practice, the outputs of 503 are enabled during the time the register 410 contains the byte of the same order, and not during the time that byte is received. Thus, by example, iT'3 is defined by a level which goes to low level at the end of the first bit of the byte iT4 of the received frame, and which goes back to high level at the end of the fourth bit of said byte. In practice, the transfers or activations controlled by a time slot iT' also occurs for a low-to-high level change.

The counter 502 is also connected from the automaton circuit 414 through a link RTAIL which transmits the value n defined as previously mentioned by a token TAIL 32, TAIL 64 or TAIL 96.

Figure 12:
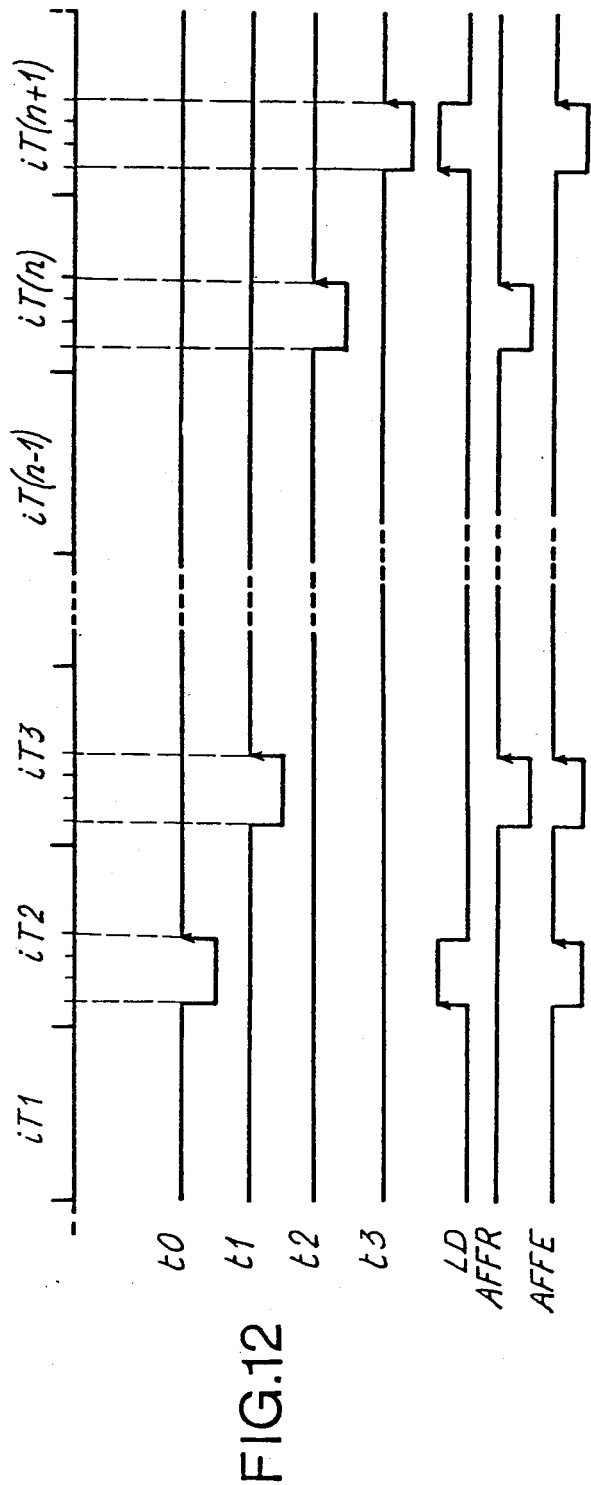
FIG. 12 is a time diagram defining the timing signals used in the automaton circuit shown in FIG. 11.

The circuit 505 converts the signal iT'1, iT'2, iT'(n−1) and iT'n into four signals t0, t1, t2 and t3. The time diagram of the FIG. 12 shows the signals t0 to t3. The output wires t0–t3 of the circuit 505 are connected to the input channel 1103 (FIG. 11) of the automaton circuit 414.

Referring to FIG. 12, a signal LD goes to high level when t0 and t3 go to low level, a signal AFFR goes to high level with t1 and t2, and a signal AFFE goes to high level with t0, t1 and t3. In logical form, and as only the low-to-high changes are taken in account, it may be written:

$$LD = t0 + t3$$

$$AFFR = t1 + t2$$

$$AFFE = t0 + t1 + t3$$

In practice, the signals LD, AFFR and AFFE are generated in a translation circuit 1102 (FIG. 11) of the automaton circuit 414 which will be described later on.

The receiving CRC operator CRC 404 is a conventional circuit performing the division of the bit sequence received from 401 by a polynomial in order to provide the control sequence which is nil if there are no errors in the received message. The output of the circuit 408 is enabled during the time interval iT'n.

Figure 6:
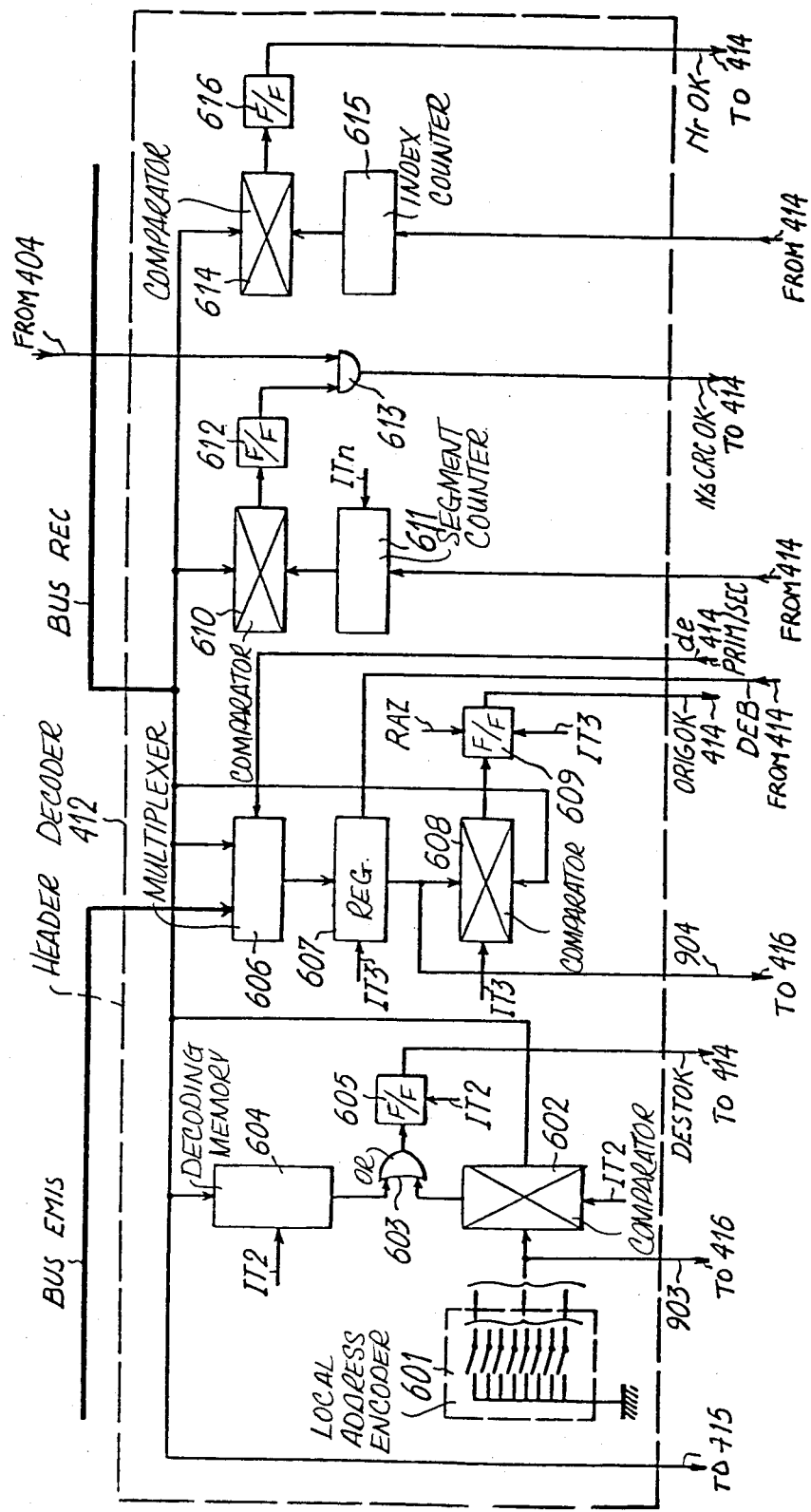
FIG. 6 is a block-diagram of the header decoding circuit of the unit UCG shown in FIG. 4.

The decoding circuit 412 shown in FIG. 6 comprises a local address encoder 601 of which the output is connected to one input of a comparator 602, the other input of which being connected from the receiving bus BUS REC and its output being connected to one output of a two-input OR gate having 603. The second input of the OR gate 603 is connected from the output of a broadcasting address decoding memory 604 of which the input is connected from the bus BUS REC. The output of the OR gate 603 is connected to the input of a memory flip-flop 605 of which the output is connected to a wire DESTOK, itself connected to one input of the procedure automaton 414. The enabling inputs of the circuits 602, 604 and 605 are connected from the output iT'2 of 503, FIG. 5.

The circuit 412 also comprises a multiplexer 606 of which one input is connected from the receiving bus BUS REC, and the other input is connected from the transmitting bus BUS EMIS, its output being connected to the input of a register 607. The output of the register 607 is connected to one input of a comparator 608, the other input of which being connected from the bus BUS REC and its output being connected to the input of a memory flip-flop 609; the output of flip-flop 609 is connected to the wire ORIGOK which is connected to the procedure automaton 414. The control input of the multiplexer 606 is connected from the automaton 414 by means of a wire PRIM/SEC, the information from the bus BUS EMIS or from the bus BUS REC being switched towards the register 607 and through the multiplexer 606 according to the condition of wire PRIM/SEC. One enable input of the register 607 is connected from the output iT'3 of 503 and another enable input is connected from the automaton 414 by means of a wire DEB, this input being enabled at the beginning of a dialogue. The enable inputs of the comparator 608 and flip-flop 609 are connected from the output iT'3.

In addition, the circuit 412 comprises a comparator 610 having one input connected from the bus BUS REC and the other connected from the output of a segment counter 611, its output being connected to the input of a memory flip-flop 612. The reset input of the counter 611 is connected from the automaton 414 by means of a wire PRIM/SEC. The output of the flip-flop 612 is connected to one input of a AND gate 613 which has a second input connected from the output of the operator 404, and its output connected to the wire NsCROCK, itself connected to the automaton 414. The increment input of the counter 611 is connected from the output iT'(n−1)·RR + RRFIN, as the enable input of the comparator 610 and the flip-flop 612. To be noted that the output of the operator 404 is active at the time iT'n.

At last, the circuit 412 comprises a comparator 614 having one input connected from the bus BUS REC, the other input connected from the output of an index counter 615, and its output connected to the input of a memory flip-flop 616, of which the output is connected to the wire NrOK, itself connected to the automaton 414. The enable inputs of the circuits 614–616 are connected from the output iT'n as well as the increment input of the counter 615.

The encoder 601 is symbolized by eight wires which are grounded or not through contacts either closed or open. The contact combination defines the local identity of the station. The memory 604 may be a PROM of which the input wires are connected to the bus BUS REC and the output to 603. The counters 611 and 615 are set to "00" at the beginning of each dialogue, through the wire PRIM/SEC. The counter 611 is incremented each time a segment is received, and, thus, it always contains the index of the next expected segment. The counter 615 is also incremented each time an acknowledgment RR or RRFIN is received, and, thus, it contains the index of the expected acknowledgment.

The decoding circuit 412 operates as follows. When the byte iT2 containing the address of the addressed station appears at the output of the register 410, i.e. on the receiving bus BUS REC, the comparator 602, enabled by iT'2, supplies an output signal which is at "1" if that identity corresponds to the information contained in the encoder 601, and at "0" in the other case. The output signal is transferred through the OR gate 603 and stored in the flip-flop 605. Thus, the information DESTOK is available on the wire DESTOK toward the automaton 414. In case the subframe STP contains a broadcasting message, the byte iT2 is recognized in the circuit 604 of which the output signal is transferred through the second input of the OR gate 605 for providing the information DESTOK.

In case the station is a primary station in the dialogue, the multiplexer 606 allows to introduce the identity of the secondary station of the dialogue into the register 607. That information is transferred at the beginning of the dialogue by the transmitting circuit 415 through the bus BUS EMIS. On the contrary, if the station is a secondary station, the multiplexer 606 allows to receive the identity of the primary station, from the bus BUS REC, such an identity being in the first segment sent from the primary station. Thus, at the time of the first segment, the identity is introduced into 607 and stored in 607 for the whole duration of the dialogue. During the time the next segments of the dialogue are received, byte iT3 contains the same identity which is directly supplied to the other input of the comparator 609. Thus, for each frame, the flip-flop 609 supplies the information ORIGOK, after iT'3.

The byte iT4 contains the index of the received segment, which is compared in the comparator 610 with the expected index contained in the counter 611. The result of the comparison is stored in the flip-flop 612. When the control sequence has been calculated in the CRC operator 404, FIG. 4, i.e. at the time iT'n, the result is transferred to the AND gate 613, and thus, at this time, the information NsCRCOK is supplied from AND gate 613.

Among others, the octet iTn contains the index of the received acknowledgement, which is compared in the comparator 614 with the expected index contained in the counter 615. Thus, the information NrOK is supplied from the flip-flop 616, after iT'n.

Figure 7:
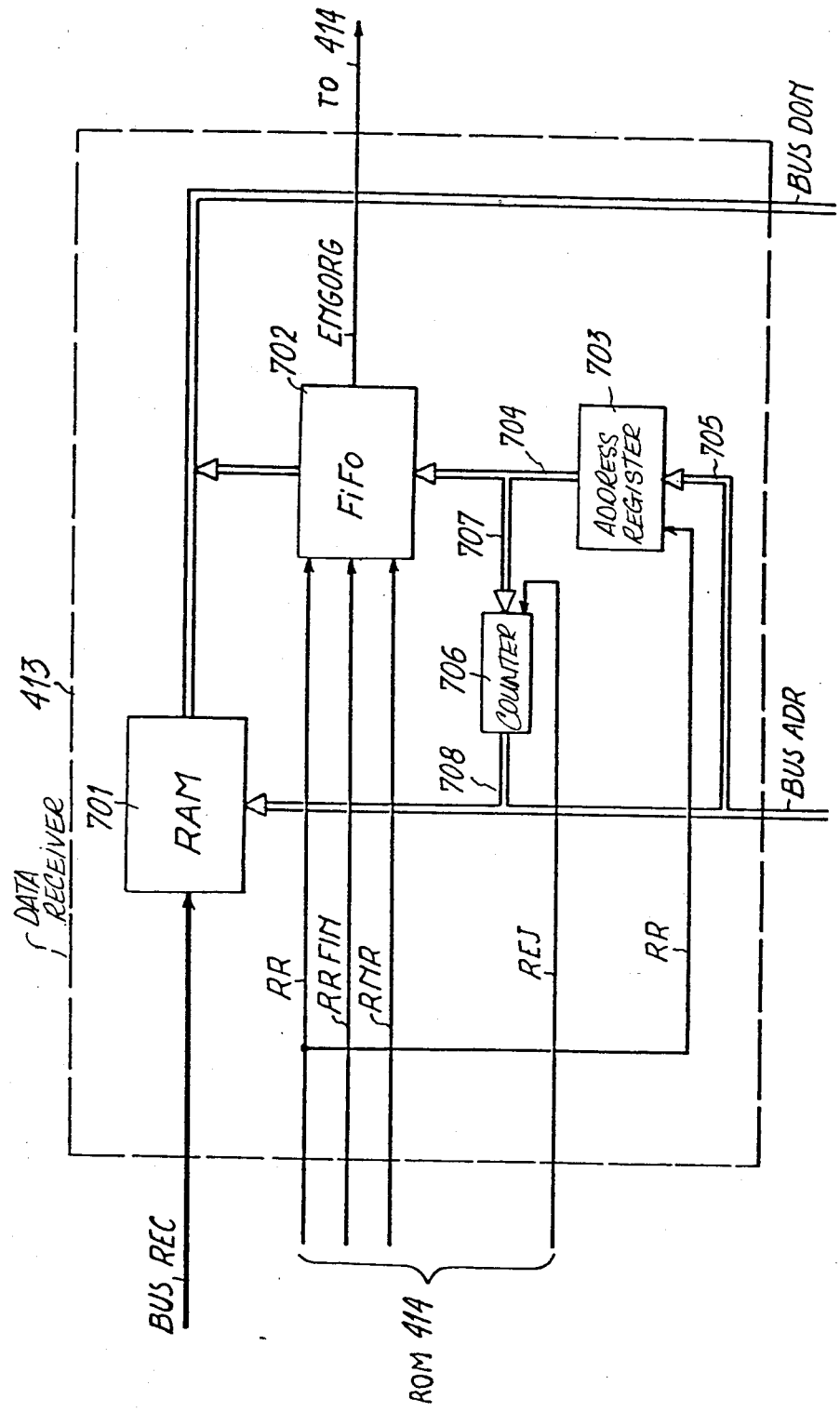
FIG. 7 is a block-diagram of the receiver circuit of the unit UCG shown in FIG. 4.

The receiving circuit 413 shown in FIG. 7 comprises a RAM memory 701 having its data input connected from the receiving bus BUS REC, its data output connected to the data bus BUSDON (FIG. 4), and its address input connected from the address bus BUSADR. A memory FiFo 702 is associated with the memory 701; the data input of the memory FiFo is connected from the output of a segment start address register 703 by means of a link 704, and its output is connected to the data bus BUSDON. The data input of the register 703 is connected from the address bus BUSADR, by means of link 705, and its output is also connected to the input of a counter 706 through a branch line 707 of the link 704. The counter 706 is incremented each time an octet is received for each received segment, and is used as a pointer for the memory 701. The output of the counter 704 is connected to the address bus BUSADR, through a link 708.

The octets of each segment transferred through the bus BUS REC are stored one by one in the memory RAM 701. At the beginning of each segment, the counter 706 contains the address at which the first octet of the next segment must be stored. The register 703 is connected to the automaton 414 through a wire SEC+RRrec; at the beginning of each segment and each time a segment has been correctly received, the register is informed through said wire, that, by means of 708 and 705, it has to call for the content of the counter 706. The counter 706 is also connected to the automaton 414 through a wire REJ.

The FiFo memory 702 is used for storing the addresses of the RAM memory 701, the beginning parts of each segment written one after the other into the memory FiFo being stored at those addresses. Each word in the memory FiFo 702 comprises, in addition to the address bits of the segment beginning in 701, two signalling bits used for storing how ends the transmission of the received packet. To this end, the FiFo memory 702 has three inputs respectively connected from wires RRrec, RRFINrec and RNRrec, which are connected from the corresponding outputs of the automaton circuit 414. If the packet ends correctly, the first signalling bit is set to "1" when the order RRFIN is received, while it does not change when the order RR is received. On the contrary, if, for some reason, the transmission of the packet is prematurely interrupted, the second signalling bit is set to "1" by the wire RNR.

In practice, the FiFo memory 702 comprises two FiFo memories in series, each memory having a capacity of sixteen words. In a conventional manner, one of the connecting wires between the two memories is actived when the second memory is full, i.e. when the first one is no longer empty. That wire is connected to the corresponding input of the circuit 414 through a wire ENGORG.

At the end of a segment, if the automaton 414 notes the just received segment is correct by means of the wire RRec set at the level "1", it gives to the register 703 the order to call for the contents of the counter 706, through 708, BUS ADR and 705. On the contrary, if the automaton 414 notes an error in the receive segment, the wire REJ is set to "1" and the contents of the register 703 is transferred into the counter 706. In other words, in this case, the octets of the next segment will be stored in the RAM memory 701 at the same addresses as those of the erroneous received segment. On the other hand, the wire RRrec or RRFIN is activated each time a correct segment is received, by which the contents of the register 703 is transferred into the memory FiFo 702, through 704. Thus, as the segments of the packet are received, the addresses of the memory 701, at which are stored the beginning parts of each segment, are stored one after the other into the FiFo memory 702.

The contents of the FiFo memory 702 may be read out by the microprocessor 417 by means of the bus BUSDON; then, the useful bytes of the received packets may be read out into the RAM memory 701 by the microprocessor, through the bus BUSADR, at the addresses which have been read out from the FiFo memory 702. The two signalling bits of the FiFo memory 702 allow it to read out the received packets and supply them to the terminals served by the cluster control unit UCG, according to their contents.

Figure 8:
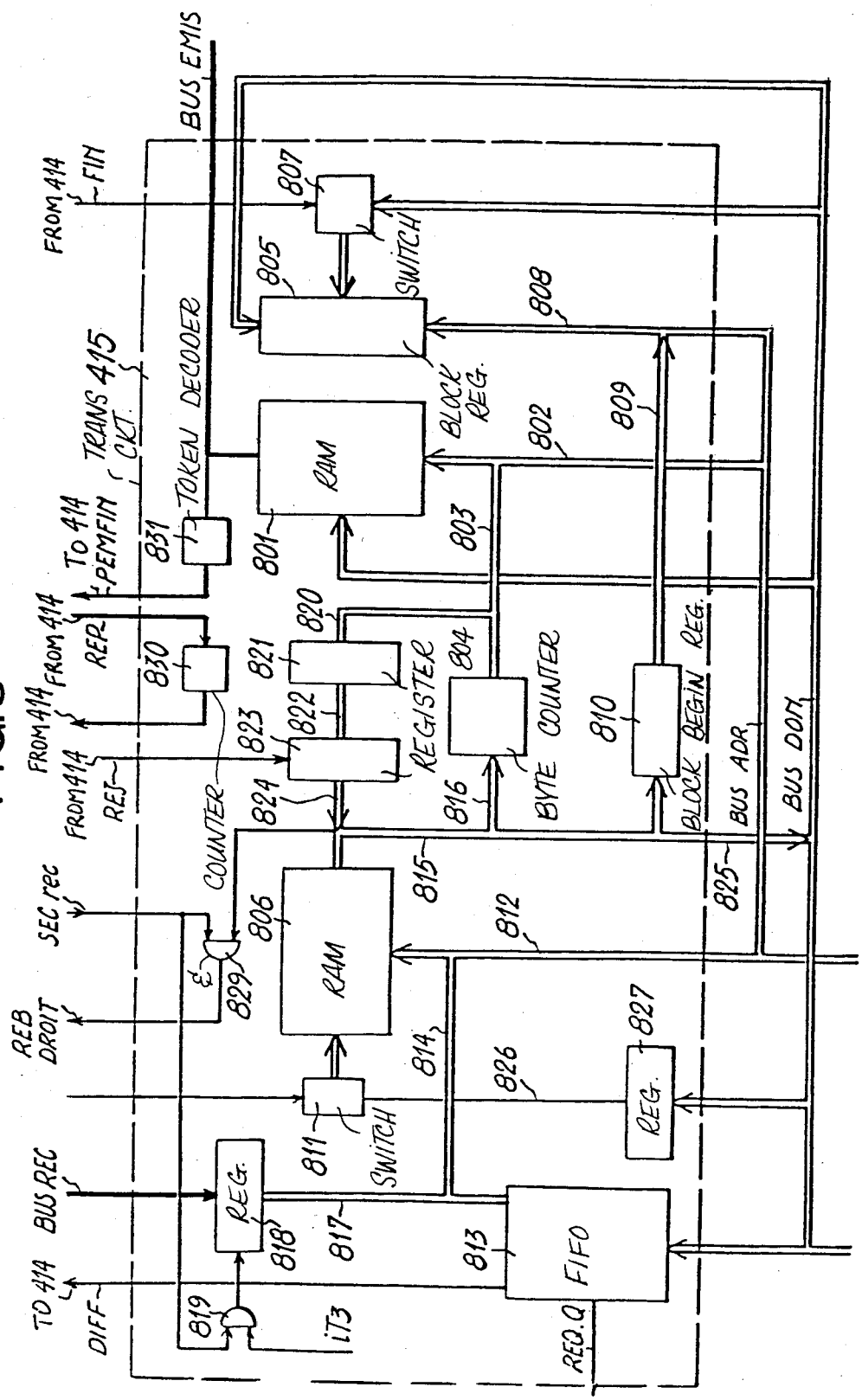
FIG. 8 is a block-diagram of the transmitter circuit of the UCG unit shown in FIG. 4.

The transmitting circuit 415 shown in FIG. 8 comprises a RAM memory 801 of which the data input is connected from the bus BUSDON, its data output being connected to the transmitting bus BUS EMIS and its address input, from the bus BUSADR through the link 802, on one hand, and, on the other hand, from the output of a byte counter 804 through a branch line 803 of the link 802. The memory 801 comprises sixteen blocks, each of them being able to store a whole packet, with eventually several segments, which is to be sent to another station. Two packets to be sent to the same other station cannot be simultaneously stored in the memory 801.

A block state register 805 and a pointer RAM memory 806 are associated with the memroy 801. The data input of the register 805 is connected from the output of a switch 807; its address input is connected, on one hand, from the address bus BUSADR through a link 808, and, on the other hand, through a branch line of the link 808 from a block beginning register 810; its data output is connected to the data bus BUSDON. The data input of the pointer memory 806 is connected from the output of a switch 811; its address input is connected, on one hand, from the bus BUSADR through a link 812, and, on the other hand, from the output of a FiFo memory 813 through a branch line 814 of the link 812; its data output is connected to the input of the register 810 through a link 815. A branch line 816 of the link 815 is connected to the input of the counter 804.

The data input of the FiFo memory 813 is connected to the bus BUSDON. Said memory has a control output which is connected to the automaton circuit 414 through the wire REQ.Q and which is activated as soon as the FiFo memory 813 is no longer empty. A branch line 817 of the branch line 814 is connected to the output of a register 818; the data input of register 818 is connected from the receiving bus BUSREC and its enable input from an AND gate 819 having one input connected from the wire SECrec and the other from the output iT3 of the time base 403, FIGS. 4 and 5.

The branch line 803 connected from the output of a byte counter 804 has a branch line 820 connected to the input of a register 821; the output of register 821 is connected to the input of a second register 823, through a link 822. The output of the register 823 is connected to the link 815, through a branch line 824. The link 815 is also connected to the bus BUSADR through a branch line 825.

One input of the switch 807 is connected from the data bus BUSDON, switch 807 having a reset input connected from the automaton circuit 414 through a wire FIN. In the same manner, one input of the switch 811 is connected from the output of a register 827 through a link 826, switch 811 having a reset input connected from the automaton circuit 414 through a wire FIN, and the data input of register 827 being connected from the bus BUSDON.

At last, a wire 828 of the link 815 is connected to one input of an AND gate 829 of which the other input is connected from the wire SECrec, and the output, to the automaton 414 through a wire REQ.DROIT.

The circuit 415 shown in FIG. 8 further comprises a counter 830 of which the decrement input is connected from the wire REP connected from an output of the automaton circuit 414; the load input of counter 830 is connected from the wire PRIM.SEC, and its output "0" is connected to a corresponding input of the circuit 414 by means of a wire REPMAX. In practice, at the time the dialogue begins by means of the wire PRIM.SEC, the counter is loaded with a predetermined number equal to the maximum number of segment repetitions allowed to the unit UCG, that number being decremented each time a segment is repeated. When the counter is at "0", the local event REPMAX is transmitted.

In addition, the circuit 415 comprises a token decoder 831 which is connected from the transmitting bus BUS EMIS; the output of decoder 831 is connected to the corresponding input of the automaton circuit 414 by means of the wire PEMFIN.

The local even PEMFIN is transmitted by the decoder 830 each time the bus BUS EMIS transmits a token PRD or PFIN.

At last, the words written into the FiFo memory 813 contain the bits for addressing the pointer memory 806, plus one bit which is at "1" if the packet to be transmitted and written in 801 must be broadcasted to all the other stations of the loop, and which is at "0" in the other case. Therefore, a wire FIF connected to a corresponding input of the circuit 414 is associated with the output branch line 814 of the memory 813.

For transmitting a packet from a terminal served by the UCG towards an addressee station B, the address of B is written into the FiFo memory 813 by the microprocessor, through the bus BUSDON. On the other hand, under control of the microprocessor, and through BUSADR, the RAM memory 806 is addressed for writing with the address B, and, in the register 807 introduced is the address of the beginning of the block X which, in the memory 801, is chosen by the microprocessor for storing the packet to be transmitted to the station B, the block beginning address being written into the pointer memory 806 through the link 826 and the switch 811.

From this time, each time the memory 806 is addressed for reading by means of the address B, it supplies on the link 815 the address of the beginning of the block X, that address being transferred to the register 810, on one hand, and, on the other hand, to the counter 804. The block condition register 805 is addressed for writing by the output information of the register 810. On the other hand, the transmitting memory 801 is addressed for reading by the output information of the counter 804, that information being transferred to the register 821 through the branch line 820. The counter 804 is incremented each time a byte is supplied from the memory. Therefore, at each time, for 801, the address of the next byte to be transmitted appears at the output of 804. At the end of a transmitted segment, the output information of 804 is X(n+1). Xn is still in the register 821. At the beginning of the transmission of the next segment, the information Xn contained in 821 is transferred through 822 into the register 823, the information X(n+2) at the output of 804 being transferred into the register 823 and the information Xn being stored in the register 821. Thus, it appears that the second segment is transmitted to the station B even if the first transmitted segment has not been correctly acknowledged; but, after this transmission, the register 823 is controlled by the wire REJ connected to the automaton, so that its contents X is transferred to the counter 804, through 824, 815 and 816. Therefore, the counter 804 is decremented by two, so that the non-acknowledged segment is retransmitted with the following segments.

In practice, the memory 806 can be addressed for reading in the two following manners.

First, the local station is a primary one in the engaged dialogue. The read out of the FiFo memory is controlled by the wire PRIMDEB. Therefore, the first address available at the output of 813 is read, and the packet begins to read out which is stored in the block of which the beginning address is given by the memory 806 to the counter from the information read out of FiFo memory 813.

Therefore, if the station is a primary station, the packets are transmitted in the order of the addresses of the corresponding addressee stations which have been written in the FiFo memory 813 by the microprocessor 417.

The header generating circuit 416 comprises a token and acknowledgment register 901 of which the input is connected from the automaton 414 through the link 902, an acknowledgment source byte register 903 of which the input is connected from the output of the local address encoder 601 of the circuit 412 (FIG. 6), through the link 904, and an interlocutor address register 905 of which the input is connected from the output of the register 607 (FIG. 6), through the link 906. The outputs of the registers 901, 903 and 905 are connected to the transmission bus EMIS.

The outputs of the registers 901, 903 and 905 are respectively activated at the time intervals iT"1, iT"2, iT"3, iT"n of the transmitted subframe. When a token LIBR is being transmitted, only the output of the register 901 may be activated at the time interval iT"1. All the outputs are activated when a token PRES is transmitted. If a token PRD, PRNR, PRCT or PFIN is being transmitted, the outputs are not activated at the times iT"1, iT"2 and iT"3, for the corresponding data have been directly written by the microprocessor 417 into the memory 801 (FIG. 8); on the contrary, the output of 805 may be activated for transmitting an acknowledgement if the unit UCG has received a segment.

Figure 10:
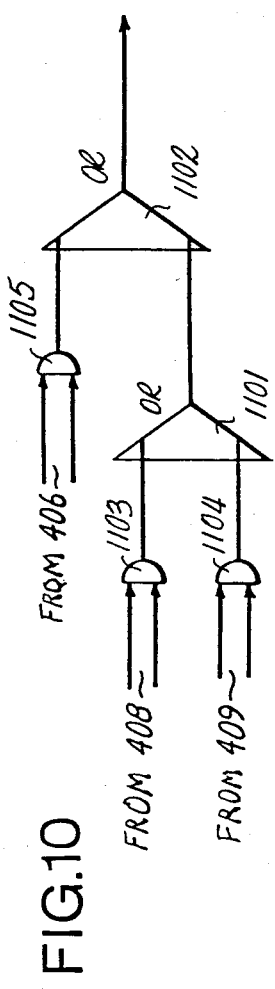
FIG. 10 is a block-diagram of the multiplexer circuit of the unit UCG shown in FIG. 4.

Referring to FIG. 10, the multiplexer 411 comprises essentially two OR gates 1101 and 1102. The first input of the OR gate 1101 is connected from the output of an AND gate 1103 of which an input is connected to the series output of the converter 408, its other input being enabled at the time intervals iT"1 to iT"(n−2) and iT"n of the transmission frame. The second input of the OR gate is connected from the output of the transmitting operator CRC 409, its other input being enabled at the times iT"(n−1) and iT"(n−2).

One input of the OR gate 1102 is connected from the output of the multiplexer, the other being connected from the output of a gate 1105 of which one input is connected from the output of the circuit data processing circuit 406 and the other is enabled from times iT"(n+1) to time iT"127 of the outgoing frame.

The automaton circuit 414 shown in FIG. 11 comprises an input register 1101 of which the parallel inputs are connected from the receiving bus BUS REC and the outputs are connected to the inputs B0 to B7 of a translator circuit 1102. Inputs t0-t3, DESTOK, ORIGOK, NsCRCOK and NROK of translator circuit 1102 are connected from the corresponding wires of an input channel 1103.

Outputs J0-J3, POK, AFFE, AFFR and LD of translator circuit 1102 are connected to an internal channel 1104 which has also inputs t0-t3 and REQ.-DROIT, REQ.Q, TOUT, PEMFIN, ENGORG, REPMAX and DIF which are connected from the corresponding wires of the input channel 1103. In practice, the channels 1103 and 1104 are made of wire bundles, as the output channel 1107 which will be described later on.

The output wires of the internal channel 1104 are connected to a receiver automaton 1105, on one hand, and, on the other hand, a transmitter automaton 1106.

The data input wires of the receiver automaton 1105 comprise wires t0, t1, t2, TOUT, ENGORG, ELIB, REQ, PRIM, POK and J0-J3. The receiver automaton 1105 has also a clock input AFFR which has been above mentioned in conjunction with FIG. 12 and a ground input GND. Its data outputs FR0-FR3 and RLIB are connected to the output channel 1107. The wire RLIB is also connected to the internal channel 1104. At last, it has an initialization control input PR.

The data input wires of the transmitter automaton 1106 comprise wires t0, t1, t2, TOUT, REPMAX, RLIB, DIF, DESTOK, REQ, PRIM, PEMFIN and J0-J3. The transmitter automaton 1106 has also the above mentioned clock input AFFE and a ground input GND. Its data outputs are connected to the wires FE0-FE3, DIAL and ELIB which are connected to the output channel 1107. The wire ELIB is also connected to the internal channel 1104. The wires FE0-FE3 and DIAL are also connected to the inputs of a translator circuit 1108, of which one output is connected from the channel 1104 through the wire REQ and an other output from the input PR of a flip-flop 1109. The other input of the flip-flop 1109 is connected from the wire DIAL, and its output PRIM is connected to the channels 1104 and 1107. At last, the transmitting automaton 1106 has an initialization control input PR.

The detailed operation of the circuit 414 will now be described, but the signals transferred through the receiving bus BUS REC and through the input channel 1105 will be first described, such signals being called either "external events" or "local events".

In practice, the external events are the various above mentioned tokens and the local events are the following:

- event DESTOK which corresponds to an identity recognition in the byte iT2 carrying the addressee address, DESTOK being delivered from the flip-flop 605 shown in FIG. 6,
- event ORIGOK which corresponds to the recognition of the interlocutor station address in the byte iT3 containing the source address, ORIGOK being delivered from the flip-flop 609 shown in FIG. 6,
- event NsCRCOK which corresponds to a segment number and a frame control sequence which have been found correct, NsCRCOK being delivered from the AND gate 613 shown in FIG. 6,
- event NrOK which corresponds to an acknowledgment number and an acknowledgment which have been found correct, NrOK being delivered from the flip-flop 616 shown in FIG. 6,
- event REQ.Q which corresponds to a transmission request addressed to any one of the stations, REQ.Q being delivered from the memory FiFo 813 shown in FIG. 8,
- event REQ.DROIT which corresponds to a dialogue transmission request when a packet is received which has been transmitted by another station, REQ.DROIT being delivered from the AND gate 809 shown in FIG. 8,
- event TOUT which corresponds to "time out" condition and indicates a defective operation; TOUT is here considered as an external event for a better understanding of the invention, but, in practice, it is combined with the other functions of the automaton,
- event PEMFIN which corresponds to the fact that the last segment of a packet has been sent, PEMFIN being delivered from the decoding circuit 831 of the FIG. 8,
- event ENGORG which corresponds to the fact that the FiFo memory 702 of the receiver circuit 413 has almost reached the point of congestion, ENGORG being delivered from the memory FiFo 702 of the FIG. 7,
- event REPMAX which corresponds to the fact that the maximum number of repetitions of a segment has been reached, REPMAX being delivered from the counter 830 shown in FIG. 8,
- local event SEGMT which corresponds in practice to the event DESTOK at the time t1.

To be noted that those events are taken into account at predetermined times among the times t0-t3.

The functions of automatons 1105 and 1106 have been respectively listed in the following tables I and II.

The procedure automatons insure the functions which are depicted in the graph shown in FIG. 13. In that graph, those conditions of the automatons which are considered as "stable" are represented by circles interconnected by arcs which symbolize the transitions between those stable conditions. The conditions referenced R3 to R6 are peculiar to the transmission algorithm, the conditions referenced E3 to E7 are peculiar to the transmission algorithm, and the conditions referenced ER0, ER1, ER2 and ER8 are common to those two algorithms.

Indeed, the automaton circuits 1105 and 1106 not only deliver various output signals depending on the applied input signals, but also change their conditions in response to those input signals. In addition, the output signals from the automatons depend not only on the input signals, but also on the current automaton conditions at the time the input signals are applied to. In FIG. 11, the fact that the automaton conditions can change is illustrated by the box "COND" including a curved arrow. When initiating a unit the two inputs PR are enabled to preset the automaton conditions.

The incidental events which are significant for one or the other of those algorithms are indicated between brackets above the transition arcs, while the functions insured during the transitions are indicated under the arcs, and always preceded by a point. If the transitions have no effect on the stability of the condition in process, they are represented as arcs having the same condition from their origin to their issue.

The condition ER0 corresponds to the condition "SWITCHING ON". When the station is powered on, event (ALIM), the communicator, i.e. the assembly of 1105 and 1106, is set in condition ER0. When a token (LIBR) is received, arc 101, its transmits an awake request to the unit UCB, that request being indicated by the function .EVEIL. Either the unit UCB may have to test the communicator and then transmits a token (DISC), arc (102), so that the communicator turns to the condition ER1; or the unit UCB may have to directly transmit the segment size parameters and thus transmits a token (TAIL), arc 103, that initiates the function .RTAIL without changing the condition of the communicator; then, the unit UCB transmits the token (ACTIV), arc 104, and the communicator turns to the condition ER2.

routine without changing its condition if it has received the token (TST), arc 106.

The condition ER2 corresponds to the condition "SWITCHING ON" which is the only condition allowing a station to hold a dialogue through the loop. In and between the conditions ER0 to ER2, both the transmitter and receiver automatons evolve together. In conditions ER0–ER2, the communicator is in the "out of dialogue" phase.

If the communicator has a message to transmit, that is expressed by the internal event REQ (transmission request), and if it receives a token (LIBR), arc 107, the result is the function .DIALPRIM (dialogue with primary status), and the communicator turns the condition ER2 to the condition ER3 which corresponds to the condition READY TO TRANSMIT.

In the condition E3, the external event (LIBR) or the local event (SEGMT) result in the function .TRANSMIT, arc 108, and the communicator turns from the condition E3 to the condition E4 which corresponds to the condition READY TO ANTICIPATE.

In the condition E4, if the segment to be transmitted is marked by a token PRND or PCRT, i.e. the local event is not PEMFIN, the event SEGMT, arc 109, results in the function .TRANSMIT and the condition E5 which corresponds to the condition WAIT FOR ACKNOWLEDGMENT. In condition E5, if the external event (RR) occurs, arc 110, it results in the function .RR and the condition turns to E4, which indicates that the last segment has been correctly received by the addressee station and that the next segment may be transmitted; if the event (REJ) occurs, indicating that the addressee station considers the last segment as not

TABLE I

RECEIVER AUTOMATON

| AFF | FUNCTION | MEANING | CODE |
|---|---|---|---|
| T1 | RTAIL | CHANGE THE SEGMENT SIZE | 0101 |
| T1 | EVEIL | SEND A TOKEN EVEIL | 0110 |
| T1 | RTST | INITIATE TEST PROCEDURE | 0111 |
| T1 | RDID | BROADCASTING DIDON | 1000 |
| T1 | DIAL SEC-PRND | REC. 1ST DIALOGUE SEGMENT | 1001 |
| T1 | DIAL-SEC-PRD | REC. 1ST AND LAST SEGMENTS | 1010 |
| T1 | RPCRT | REC. CURRENT SEGMENT | 1011 |
| T1 | RPFIN | REC. LAST SEGMENT | 1100 |
| T1 | RPDIF | BROADCASTING CARTHAGE | 1101 |
| T2 | RR | ANSWER RR | 0001 |
| T2 | RRFIN | ANSWER LAST RR | 0010 |
| T2 | REJ | ANSWER REJ | 0011 |
| T2 | RNR | ANSWER RNR | 0100 |

TABLE II

TRANSMITTER AUTOMATON

| AFF | FUNCTION | MEANING | CODE |
|---|---|---|---|
| T0 | DIAL-PRIM | TRANSMIT THE FIRST SEGMENT | 0101 |
| T1 | EPRES | RESERVE THE SEGMENT | 0111 |
| T1 | TRANSMIT | TRANSMIT OR REPEAT SEGMENT | 1000 |
| T1 | HD-LIBR | TRANSMIT LIBR (DIALOGUE END) | 1001 |
| T1 | HD-PRES | TRANSMIT PRES (DIALOGUE END) | 1010 |
| T1 | HD-TOUT | DIALOGUE END CAUSE TOUT | 1011 |
| T3 | RR | REC. CURRENT RR | 0001 |
| T3 | RRFIN | REC. LAST EXPECTED RR | 0010 |
| T3 | REJ | PREPARE FOR REPEATING | 0011 |
| T3 | RNR | CORRESPONDENT CONGESTED | 0100 |

The condition ER1 corresponds to the condition SUPERVISE which is always the result of the reception of the token (DISC). When being in this condition, either it returns to condition ER0 when it has received the token (MES), arc 105, or it initiates an internal test correct, the result is the function .REJ, arc 111, the communicator returning to the condition E3; and if the event (RNR) occurs, indicating that the receiving station is congested, the result is the function .RNR, arc 112, the communicator turning to the condition E7 which corresponds to the condition TRANSMITTER FREE. At last, if the event (TOUT) occurs, indicating a defect in the transmitter, arc 113, the communicator turns to the condition E7.

In the condition E4, if the segment to be transmitted is marked by a token PRD or PFIN, i.e. the local event is PEMFIN, the event SEGMT, arc 114, results in the function .EPRES and the condition E6 which corresponds to the condition WAIT FOR LAST ACKNOWLEDGMENT. In the condition E6, if the external event (RR) occurs, it results in the function .RRFIN, arc 115, and in a condition change to E7; if the event (REJ) occurs, it results in .REJ, arc 116, and the condition E3. At last, the event (TOUT), arc 117, results in the condition E7.

In the conditions E3 and E4, the event (TOUT) of the event REPMAX results in a condition change to E7, arcs 118 and 119.

In the condition E4 and at the time t3, if the event ETDIF, arc 120, occurs, it results to a condition change to E8 which corresponds to the condition BROADCAST, i.e. a condition in which a message marked by the token DIFF is broadcasted by the station to the other stations. In the condition ER8, the event (DIFF), are 121, results in the function .TRANSMIT without condition change. Of course, in this case, no acknowledgment is to be waited. The communicator turns from condition ER8 to condition ER2 either while performing the function .HD-TOUT if the event (TOUT), arc 123, occurs.

In the condition E7, if the event (SEGMT), arc 124, occurs, it results in the function .EPRES without condition change. Also, in the condition E7, and at the time t0, if the event (REQ.DROIT), arc 125, occurs, it results in the function .READY TO TRANSMIT in DUPLEX mode and in the condition E3 of the transmitting automaton.

In the condition ER2, if the communicator receives a token (PRND), arc 126, the function .DIAL-SEC-PRND is established, indicating that the first segment of a dialogue is received, and the receiving automaton changes turns to condition R3 which corresponds to the condition WAIT FOR N(s) AND CRC OF A PCRT.

In the condition R3, if the events N(s)OK and CRCOK occur, and if the event ENGORG is not present, they result in the function. RR, arc 127, and in the condition R5 which corresponds to the condition WAIT FOR BEGINNING OF THE NEXT SEGMENT. On the contrary, if one of the events (N(s)FAUX) or (CRCFAUX) occurs, without the event ENGORG, the result is the function .REJ, arc 128, and a change to the condition R5. At last, if the event (ENGORG), arc 129, occurs, the result is the function .RNR and a change to the condition R6 which corresponds to the condition RECEIVER FREE.

In the condition R5, if the event (PRES), arc 130, occurs, neither action nor transition occurs, and the condition of the receiving automaton does not change. If the event (PFIN), arc 131, occurs, it results in the function .RPFIN and in the condition R4 which corresponds to the condition WAIT FOR N(s) AND CRC OF A PFIN. At last, the event (TOUT), arc 132, results in the condition R6.

In the condition R6, if the event (PRCT), arc 133, occurs, it results in the function .RPRCT and in the condition R3. If the event PFIN, arc 134, occurs, it results in the function .RPFIN and the condition R4. On the other hand, if the event (PRES), arc 132, occurs, neither action, nor transition occurs, and the condition of the receiving automaton does not change.

In the condition R4, if the events (N(s)OK) or CRCOK occur, without the event ENGORG, they result in the function .RR-FIN, arc 136, and in the condition R6. On the contrary, if one of the events (N(s)FAUX) or (CRCFAUX) occurs, without the event ENGORG, it results in the function .REJ, arc 137, and in the condition R5. At last, if the event (ENGORG), arc 138, occurs, it results in the function .RNR and in the condition R6.

In the condition R2, if the communicator receives a token (PRD), arc 139, the result is the function .DIAL-SEC-PRD indicating that a one-segment packet has been received, and the receiving automaton changes for the condition R4.

If the transmitter and receiver automatons are respectively in the conditions E7 and R6, at the time t1, they turn their condition to the condition ER2, either in response to the event (PRIM).(TRSUIV) or the event (SEC)(LIBR), arc 140, while performing the function .HD-LIBR, or the event (SEC)(PRES), arc 141, while performing the function HD-PRES, or the event (TOUT), arc 142, while performing the function .HD-TOUT.

It must be added that the arc 107 is duplicated by the arc 143 which corresponds to the same event, but at the time t1 and which results in the condition R6, which is also represented in dotted line for avoiding intersections between arcs on the drawing. Also, the arcs 126 and 139 are extended to the condition E7, and, for the same reason, said condition is also represented in dotted line. In the condition R6 and at the time t2, the event (ETDIF), arc 144, results in the condition E8 which corresponds to the condition BROADCAST.

The input register 1101 is a register "S374" of which the clock input LD is connected to the internal channel 1104 through the wire LD. The input LD is enabled on the rising edges of the signal LD of the FIG. 12, i.e. for picking up the token on the bus BUS REC at the time t0, and picking up the acknowledgment on the same BUS at the time t3.

The translator circuit 1102 is a circuit of the type PAL "82 S 107" which combines the signals applied to its inputs for generating the signals according to the correspondences listed in the table III, in account of the token codes and the acknowledgment codes defined in the table IV. It will be noted that the interpretation may be made by the circuit 1102 on a token code or its complement. To be noted that the reference numbers on the input and output wires of the circuit 1102 correspond to the order numbers of the terminals of the hardware circuit, as they are indicated in the manufacturer instruction book. The tables Va and Vb give the boolean equations used in the circuit 1102.

The transmitter automaton 1106 is a circuit of the type PAL "82 S 105". The reference numbers on its input and output wires also correspond to the order numbers of the terminals indicated by the manufacturer. The table VI gives the correspondences between the input and output data of the circuit 1106. The tables VIIa and VIIb give the boolean equations used in the circuit 1106.

The receiver automaton 1105 is also a circuit of the type PAL "82 S 105" and the reference numbers correspond to the order numbers of its terminals. The table VIII gives the correspondences between its input and output data. The tables IXa and IXb give the boolean equations used in the circuit 1105.

Figure 14:
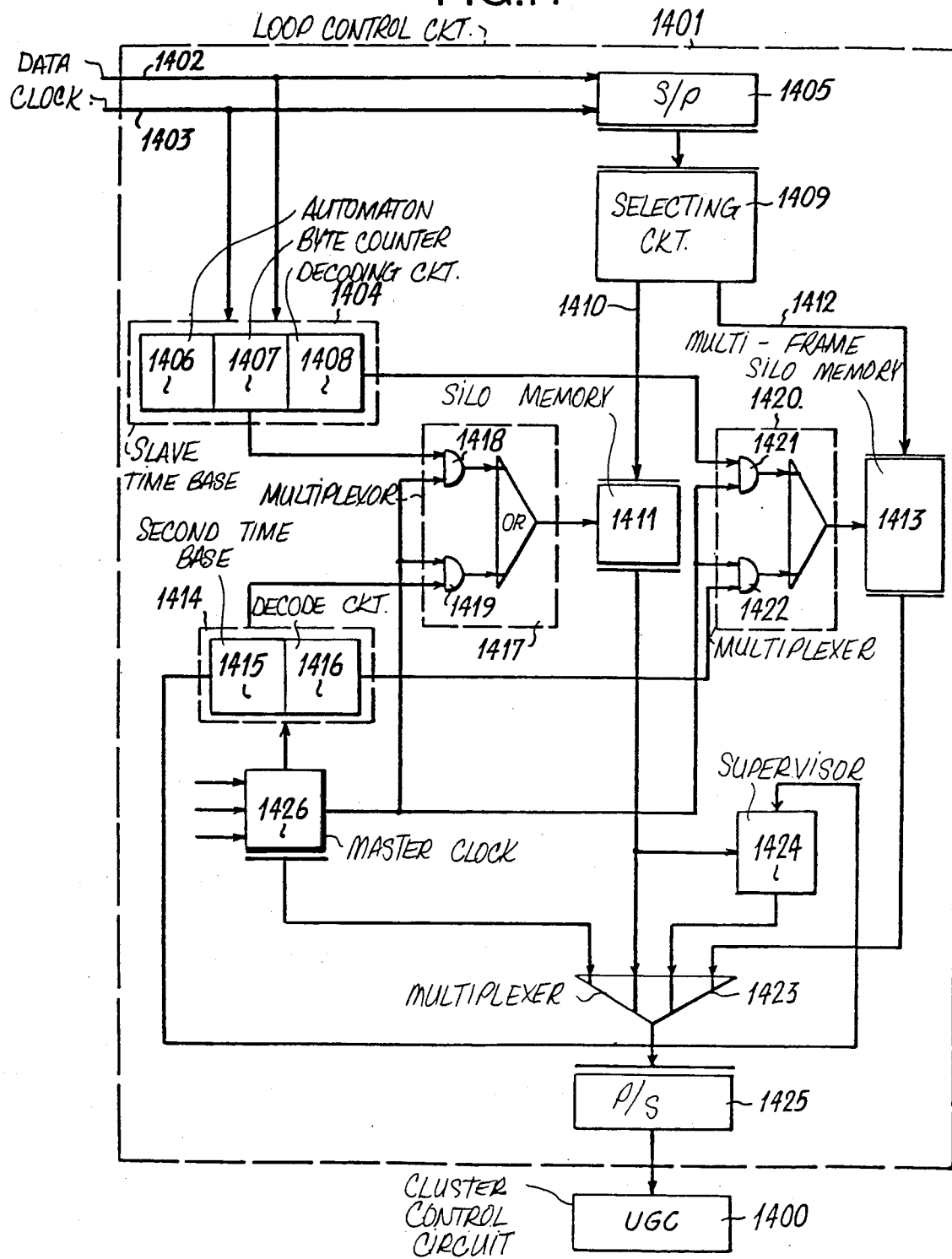
FIG. 14 is a block-diagram of the looping circuit provided in the loop control unit shown in FIG. 1.

The loop control unit UCB of the coupler 1.1 of the FIG. 1 is shown FIG. 14. In practice, it comprises a cluster control unit UCG 1400 and, above it, a looper 1401 mounted on the temporal loop. The function of the looper is to supervise the units UCG, to perform the dynamic allocation of the transmission resource, and to resynchronize the data at the relooping time. In practice, as in numerous systems, the loop control unit UCB is duplicated, as eventually may be the loop.

In the looper 1401, the wire 1402 serially transmits the data bits received from the loop, the wire 1403 transmitting the bit clock signal. The wires 1402 and 1403 are connected to the input of a slave time base circuit 1405 and the input of a series-to-parallel converter 1405. The structure of the time base circuit 1405 is similar to the one of the circuit shown in FIG. 5. It comprises a synchronizing automaton 1406, a byte counter 1407 and a frame order decoding circuit 1408.

TABLE IV

TOKEN AND AK CONFIGURATIONS

| IDENTIF. | CONFIG. | | COMPL. | |
|---|---|---|---|---|
| LIBR | 0111 | 1111 | 1000 | 0000 |
| DISC | 1011 | 0100 | 0100 | 1011 |
| DIFF | 1001 | 1001 | 0110 | 0110 |
| EVEIL | 0011 | 0100 | 1100 | 0000 |
| M.E.S. | 0010 | 0100 | 1101 | 1011 |
| TST | 0001 | 1111 | 1110 | 0000 |
| ACTIV | 1100 | 0011 | 0011 | 1100 |
| TAIL 32 | 0100 | 1000 | 1011 | 0111 |
| TAIL 64 | 1001 | 0000 | 0110 | 1111 |
| TAIL 96 | 1101 | 1000 | 0010 | 0111 |
| PCRT | 1010 | 1010 | 1101 | 1101 |
| PFIN | 0010 | 0010 | 1101 | 1101 |
| PRES | 1111 | 0101 | 0000 | 1010 |
| DID 1 | 1110 | 0111 | 0001 | 1000 |
| DID 2 | 1000 | 0100 | 0111 | 1011 |
| DID 3 | 0010 | 1101 | 1101 | 0010 |
| PRD | 0111 | 1110 | 1000 | 0001 |
| PRND | 1111 | 0000 | 0000 | 1111 |
| RR | .... | 0001 | .... | .... |
| REJ | .... | 0101 | .... | .... |
| RNR | .... | 1001 | .... | .... |

TABLE III

| EXT. | EVENT | TIME | TOKEN | OUTPUTS | FUNCTIONS |
|---|---|---|---|---|---|
| SP00 | . . . . | 1 1 . . | 1 0 0 0 0 0 0 0 | . . . . | 0 0 0 1 .LIBR |
| SP01 | . . . . | 1 1 . . | 0 1 1 1 1 1 1 1 | . . . . | 0 0 0 1 .LIBR |
| SP02 | . . . 1 | 1 1 . . | 0 1 0 0 1 0 1 1 | . . . . | 0 0 1 0 .DISC |
| SP03 | . . . 1 | 1 1 . . | 1 0 1 1 0 1 0 0 | . . . . | 0 0 1 0 .DISC |
| SP04 | . . . . | 1 1 . . | 0 1 1 0 0 1 1 0 | . . . . | 0 0 1 1 .DIFF |
| SP05 | . . . . | 1 1 . . | 1 0 0 1 1 0 0 1 | . . . . | 0 0 1 1 .DIFF |
| SP06 | . . . 1 | 1 1 . . | 1 1 0 1 1 0 1 1 | . . . . | 0 1 0 0 .MES |
| SP07 | . . . 1 | 1 1 . . | 0 0 1 0 0 1 0 0 | . . . . | 0 1 0 0 .MES |
| SP08 | . . . 1 | 1 1 . . | 1 1 1 0 0 0 0 0 | . . . . | 0 1 0 1 .TST |
| SP09 | . . . . | 1 1 . . | 0 0 0 1 1 1 1 1 | . . . . | 0 1 0 1 .TST |
| SP10 | . . . . | 1 1 . . | 0 0 1 1 1 1 0 0 | . . . . | 0 1 1 0 .ACT |
| SP11 | . . . . | 1 1 . . | 1 1 0 0 0 0 1 1 | . . . . | 0 1 1 0 .ACT |
| SP12 | . . . . | 1 1 . . | 1 0 1 1 0 1 1 1 | . . . . | 0 1 1 1 .TAIL |
| SP13 | . . . . | 1 1 . . | 0 1 0 0 1 0 0 0 | . . . . | 0 1 1 1 .TAIL |
| SP14 | . . . . | 1 1 . . | 0 1 1 0 1 1 1 1 | . . . . | 0 1 1 1 .TAIL |
| SP15 | . . . . | 1 1 . . | 1 0 0 1 0 0 0 0 | . . . . | 0 1 1 1 .TAIL |
| SP16 | . . . . | 1 1 . . | 0 0 1 0 0 1 1 1 | . . . . | 0 1 1 1 .TAIL |
| SP17 | . . . . | 1 1 . . | 1 1 0 1 1 0 0 0 | . . . . | 0 1 1 1 .TAIL |
| SP18 | . — . . | 1 1 . . | 0 1 0 1 0 1 0 1 | . . . . | 1 0 0 0 .PCRT |
| SP19 | . . . . | 1 1 . . | 1 0 1 0 1 0 1 0 | . . . . | 1 0 0 0 .PCRT |
| SP20 | . . . . | 1 1 . . | 1 1 0 1 1 0 1 | . . . . | 1 0 0 1 .PFIN |
| SP21 | . . . . | 1 1 . . | 0 0 1 0 0 0 1 0 | . . . . | 1 0 0 1 .PFIN |
| SP22 | . . . . | 1 1 . . | 0 0 0 0 1 0 1 0 | . . . . | 1 0 1 0 .PRES |
| SP23 | . . . 1 | 1 1 . . | 1 1 1 1 0 1 0 1 | . . . . | 1 0 1 0 .PRES |
| SP24 | . . . . | 1 1 . . | 0 0 0 1 1 0 0 0 | . . . . | 1 0 1 1 .DID |
| SP25 | . . . . | 1 1 . . | 1 1 1 0 0 1 1 1 | . . . . | 1 0 1 1 .DID |
| SP26 | . . . . | 1 1 . . | 0 1 1 1 1 0 1 1 | . . . . | 1 0 1 1 .DID |
| SP27 | . . . . | 1 1 . . | 1 0 0 0 0 1 0 0 | . . . . | 1 0 1 1 .DID |
| SP28 | . . . . | 1 1 . . | 1 1 0 1 0 0 1 0 | . . . . | 1 0 1 1 .DID |
| SP29 | . . . . | 1 1 . . | 0 0 1 0 1 1 0 1 | . . . . | 1 0 1 1 .DID |
| SP30 | . . . 1 | 1 1 . . | 0 1 1 0 0 0 0 1 | . . . . | 1 1 0 0 .PRD |
| SP31 | . . . . | 1 1 . . | 0 1 1 1 1 1 1 0 | . . . . | 1 1 0 0 .PRD |
| SP32 | . . . . | 1 1 . . | 0 0 0 0 1 1 1 1 | . . . . | 1 1 0 1 .PRND |
| SP33 | . . . 1 | 1 1 . . | 1 1 1 1 0 0 0 0 | . . . . | 1 1 0 1 .PRND |
| SP34 | 1 . 1 1 | 0 . 1 1 | . . . . 0 0 0 1 | . . . . | 0 0 0 1 .PR |
| SP35 | . . 1 1 | 0 . . . | . . . . 0 1 0 0 | . . . . | 0 0 1 0 .REJ |
| SP36 | . . 1 1 | 0 . . . | . . . . 1 0 0 1 | . . . . | 0 0 1 1 .RNR |
| SP37 | 1 1 1 . | 0 . . . | . . . . . . . . | 1 . . . | . . . . .LD |
| SP38 | . . . . | 1 1 1 . | . . . . . . . . | . 1 . . | . . . . .AFFE |
| SP39 | . . . . | 1 1 . . | . . . . . . . . | . 1 . . | . . . . .AFFR |
| SP40 | . . • . | .. . 0 | . . . . . . . . | 1 . . . | . . . . .POK |
| SP41 | . . . . | 0 . . . | . . . . . . . . | 1 . . . | . . . . .POK |

TABLE Va

Boolean equations of circuit 1102
Function "Products"

SP00 = T3 * T2 * B7 * /B6 * / B5 * /B4 * / B3 * /B2 * /B2 * /B1 */B0
SP01 = T3 * T2 */B7 * B6 * B5 * B4 * B3 * B2 * B1 * B0
SP02 = T3 * T2 * DESTOK * T3 * T2 * /B7 * B6 * /B5 * /B4 * B3 * /B2 * B1 * B0
SP03 = DESTOK * T3 * T2 * B7 * /B6 * B5 * B4 * /B3 * B2 * /B1 */B0

TABLE Va-continued

Boolean equations of circuit 1102
Function "Products"

| | |
|---|---|
| SP04 = | T3 * T2 * /B7 * B6 * B5 * /B3 * B2 * B1 * /B0 |
| SP05 = | T3 * T2 * B7 * /B6 * /B5 * B4 * B3 * /B2 * /B1 * B0 |
| SP06 = | DESTOK * T3 * T2 * B7 * B6 * /B5 * B4 * B3 * /B2 * B1 * B0 |
| SP07 = | DESTOK * T3 * T2 * /B7 */B6 * B5 * /B4 * /B3 * B2 * /B1 */B0 |
| SP08 = | DESTOK * T3 * T2 * B7 * B6 * B5 */B4 * /B3 * /B2 * /B1 * /B0 |
| SP09 = | DESTOK * T3 * T2 * /B7 * /B6 * /B5 * B4 * B3 * B2 * B1 * B0 |
| SP10 = | DESTOK * T3 * T2 */B7 * /B6 * B5 * B4 * B2 * /B1 * /B0 |
| SP11 = | DESTOK * T3 * T2 * B7 * B6 * /B5 * /B4 * /B3 * /B2 * B1 * B0 |
| SP12 = | DESTOK * T3 * T2 * B7 * /B6 * B5 * B4 * /B3 * B2 * B1 * B0 |
| SP13 = | DESTOK * T3 * T2 * /B7 * B6 * /B5 * /B4 * B3 * /B2 * /B1 * /B0 |
| SP14 = | DESTOK * T3 * T2 * /B7 * B6 * B5 * /B4 * B3 * B2 * B1 * B0 |
| SP15 = | DESTOK * T3 * T2 * B7 * /B6 * /B5 * B4 * /B3 * /B2 * /B1 * /B0 |
| SP16 = | DESTOK * T3 * T3 * /B7 * /B6 * B5 * /B4* /B3 * B2 * B1 * B0 |
| SP17 = | DESTOK * T3 * T2 * B7 * B6 * /B5 * B4 * B3 * /B2 * /B1 * /B0 |
| SP18 = | DESTOK * T3 * T2 * /B7 * B6 * B5 * /B4 * B3 * B2 * /B1 * B0 |
| SP19 = | DESTOK * T3 * T2 * B7 * /B6 * B5 * /B4 * B3 * B3 * /B2 * /B1 * /B0 |
| SP20 = | DESTOK * T3 * T2 * B7 * B6 * /B5 * B4 * B3 * B2 * /B1 * B0 |
| SP21 = | DESTOK * T3 * T2 * /B7 * /B6 * B5 * /B4 * /B3 * /B2 * B1 * /B0 |
| SP22 = | DESTOK * T3 * T2 * /B7 * /B6 * /B5 * B4 * B3 * B2 * B1 * /B0 |
| SP23 = | DESTOK * T3 * T2 * B7 * B6 * B5 * B4 * /B3 * B2 * /B1 * B0 |
| SP24 = | T3 * T2 * /B7 * /B6 * B5 * B4 * B3 * /B2 * /B1 * /B0 |
| SP25 = | T3 * T2 * B7 * B6 * B5 * /B4 * /B3 * B2 * B1 * B0 |
| SP26 = | T3 * T2 * /B7 * B6 * B5 * B4 * B3 * /B2 * B1 * B0 |
| SP27 = | T 3 * T2 * B7 * /B6 * /B5 * /B4 * /B3 * B2 * /B1 * /B0 |
| SP28 = | T3 * T2 * B7 * B6 * /B5 * B4 * /B3 * /B2 * B1 * /B0 |
| SP29 = | T3 * T2 * /B7 * /B6 * B5 * /B4 * B3 * B2 * /B1 * B0 |
| SP30 = | DESTOK * T3 * T2 * B7 * /B6 * /B5 * /B4 * /B3 * /B2 * /B1 * B0 |
| SP31 = | DESTOK * T3 * T2 * /B7 * B6 * B5 * B4 * B3 * B2 * B1 * /B0 |
| SP32 = | DESTOK * T3 * T2 * /B7 * B6 * /B5 * /B4 * B3 * B2 * B1 * B0 |
| SP33 = | DESTOK * T3 * T2 * B7 * B6 * B5 * B4 * /B3 * /B2 * /B1 * /B0 |
| SP34 = | NROK * ORIGOK * DESTOK * /T3 * /B3 * /B2 * /B1 * B0 |
| SP35 = | ORIGOK * DESTOK * /T0 * /B3 * B2 * /B1 * B0 |
| SP36 = | ORIGOK * DESTOK * /T0 * B3 * /B2 * /B1 * B0 |
| SP37 = | NSCRCOK * ORIGOK * DESTOK * /T2 |
| SP38 = | T3 * T1 * T0 |
| SP39 = | T2 * T1 |
| SP40 = | /T0 |
| SP41 = | /T3 |

TABLE Vb

Boolean equations of circuit 1102
Functions "Sums"

| | |
|---|---|
| F0S = | SP00+SP01+SP04+SP05+SP08+SP09+SP12+SP13+SP14+SP15+SP16+SP17+SP20+SP21+SP24+SP25 30 SP26+SP27+SP28+SP29+SP32+SP33+SP34+SP36 |
| F1S = | SP02+SPO3+SP04+SP05+SP10+SP11+SP12+SP13+SP14+SP15+SP16+SP17+SP22+SP23+SP24+SP25+SP26+SP28+SP29+SP35+SP36 |
| F2S = | SP06+SP07+SP08+SP09+SP10+SP11+SP12+SP13+SP14+SP15+SP16+SP17+SP30+SP31+SP32+SP33 |
| F3S = | SP18+SP19+SP20+SP21+SP22+SP23+SP24+SP25+SP26+SP27+SP28+SP29+SP30+SP31+SP32+SP33 |
| F4S = | SP37 |
| F5S = | SP38 |
| F6S = | SP39 |
| F7S = | SP40+SP41 |

| IDENTIFICATION | | | EVENT | INPUTS | PRESENT COND. | | FOLW. COND. | | DISPLAY | FUNCTIONS | |
|---|---|---|---|---|---|---|---|---|---|---|---|
| EP00 | 104 | ACTIV | 0 | . . . . . . | 0 0 0 1 | ER0 | 1 | ER2 | 0 0 0 0 0 0 0 | 0 0 0 0 | |
| EP01 | 102 | DISC | 0 | . . . . . . | 1 0 0 0 | ER0 | 1 | ER1 | 0 1 0 0 0 0 0 | 0 0 0 0 | |
| EP02 | 105 | MES | 0 | . . . . . . | 0 1 0 0 | ER1 | 1 | ER0 | 0 1 0 0 0 0 0 | 0 0 0 0 | |
| EP03 | 126 | PRND | 0 | . . . . . 0 | 0 0 1 0 | ER2 | 0 | E7 | 0 1 0 0 0 0 0 | 0 0 0 0 | |
| EP04 | 139 | PRD | 0 | . . . . . 1 | 0 1 0 0 | ER2 | 0 | E7 | 0 1 0 0 0 0 0 | 0 0 0 0 | .DIAL-PRIM |
| EP05 | 107 | LIBR.REQ | 0 | . . . . 0 . | 0 0 1 0 | ER2 | 0 | E3 | 1 0 1 0 0 0 0 | 0 0 0 0 | .EMETTRE |
| EP06 | 145 | TAIL | 0 | . . . . 1 . | 1 0 0 0 | ER2 | 0 | E7 | 1 1 0 0 0 0 0 | 0 0 0 0 | .EMETTRE |
| EP07 | 146 | DISC | 0 | . . . . . . | 0 1 0 0 | ER2 | 1 | ER0 | 1 0 0 0 0 0 0 | 0 0 0 0 | |
| EP08 | 108 | LIBR | 0 | . . . . . . | 0 0 1 0 | ER2 | 1 | ER1 | 1 0 0 0 0 0 0 | 0 0 0 0 | |
| EP09 | 108 | SEGMT | . | . . . . . . | 1 0 0 0 | E3 | 0 | E4 | 0 1 0 0 0 1 0 | 1 0 0 0 | |
| EP10 | 118 | REPMAX | . | . . . 0 . . | 0 1 0 0 | E3 | 0 | E4 | 0 1 0 0 0 0 0 | 0 0 0 0 | |
| EP11 | 118 | TOUT | . | . . . 0 . . | 0 1 0 0 | E3 | 0 | E7 | 0 1 0 0 0 0 0 | 1 0 0 0 | |
| EP12 | ??? | ETDIF | 0 | . . . . . . | 0 0 1 1 | E3 | 0 | E7 | 0 1 0 0 0 0 0 | 1 0 0 0 | |
| EP13 | 109 | SEGMT.PEMFIN/ | . | 1 . . . . . | 0 0 1 1 | E4 | 0 | E5 | 0 1 0 0 0 0 0 | 1 0 0 0 | .EMETTRE |
| EP14 | 114 | SEGMT.PEMFIN | . | 1 . . . . . | 0 0 1 1 | E4 | 0 | E6 | 1 0 0 0 0 0 0 | 0 0 0 0 | .EPRES |
| EP15 | 119 | TOUT | . | . . . . . 0 | 1 0 0 0 | E4 | 0 | E7 | 0 1 0 0 0 0 0 | 1 0 0 0 | |
| EP16 | 110 | RR | 0 | . . . 1 . . | 0 0 0 1 | E5 | 0 | E4 | 0 1 0 0 0 0 0 | 0 0 1 0 | .RR |
| EP17 | 111 | REJ | 0 | . . . 0 . . | 0 0 1 0 | E5 | 0 | E3 | 0 1 0 0 0 0 0 | 0 1 0 0 | .REJ |
| EP18 | 112 | RNR | 0 | . . . . 0 . | 0 1 0 0 | E5 | 0 | E7 | 0 1 0 0 0 0 0 | 0 1 0 0 | .RNR |
| EP19 | 113 | TOUT | 0 | . . . . . 0 | 1 0 0 0 | E5 | 0 | E7 | 0 1 0 0 0 0 0 | 1 0 1 0 | |
| EP20 | 115 | RR | 0 | . . . 1 . . | 0 0 0 1 | E6 | 0 | E3 | 0 1 0 0 0 0 0 | 0 0 1 0 | .PRFIN |
| EP21 | 116 | REJ | 0 | . . . 0 . . | 0 0 1 0 | E6 | 0 | E3 | 0 1 0 0 0 0 0 | 0 1 0 0 | .REJ |
| EP22 | 112 | RNR | 0 | . . . . 0 . | 0 1 0 0 | E6 | 0 | E7 | 0 1 0 0 0 0 0 | 0 1 0 0 | .RNR |
| EP23 | 117 | TOUT | 0 | . . . . . 0 | 1 0 0 0 | E7 | 0 | E3 | 0 1 0 0 0 0 0 | 1 0 1 0 | |
| EP24 | 125 | RLIB/.REQ | 0 | . . 0 . . . | 1 0 0 0 | E7 | 1 | ER2 | 0 0 1 1 0 1 0 | 1 0 0 0 | .EPRES |
| EP25 | 141 | RLIB.SEC.PRES | 0 | . . 0 1 . . | 0 1 0 1 | E7 | 1 | ER2 | 0 0 1 0 0 0 0 | 1 0 0 1 | .HD-PRES |
| EP26 | 140 | RLIB.SEC.LIBR | 0 | . . 0 0 . . | 0 0 1 1 | E7 | 1 | ER2 | 0 0 1 0 0 0 0 | 1 0 0 1 | .HD-LIBR |
| EP27 | 140 | RLIB.PRIM.TRSUI | 0 | . . 1 0 . . | 1 0 0 0 | E7 | 1 | ER2 | 0 0 1 0 0 0 0 | 1 0 0 1 | .HD-LIBR |
| EP28 | 142 | TOUT | 0 | . . . . . 0 | 1 0 0 0 | E7 | 1 | ER2 | 0 0 1 0 0 0 0 | 1 0 0 1 | .HD-TO |
| EP29 | 121 | DIFF | 0 | . . . . . . | 1 0 0 0 | E8 | 0 | E8 | 1 0 0 0 0 0 0 | 0 1 0 0 | |
| EP30 | 123 | PFIN | 0 | . . . . . . | 0 1 0 0 | E8 | 1 | ER2 | 0 0 0 0 0 0 0 | 0 0 0 1 | .EMETTRE |
| EP31 | 122 | TOUT | 0 | . . . . . 0 | 0 0 1 0 | E8 | 1 | ER2 | 0 0 0 0 0 0 0 | 1 0 0 1 | .HD-LIBR |
| EP32 | | | | | | | | | | | .HD-TO |

TABLE VIIa

Boolean equations of transmitter automaton 1105
Function "products"

| | |
|---|---|
| EP00 = | /T1 * /J3 * J2 * J1 * /J0 * P3 * P2 * P1 * P0 |
| EP01 = | /T1 * /J3 * /J2 * J1 * /J0 * P3 * P2 * P1 * P0 |
| EP02 = | /T1 * /J3 * /J2 * /J1 * /J0 * /P3 * /P2 * /P1 * P0 |
| EP03 = | /T1 * J3 * J2 * /J1 * J0 * /P3 * /P2 * P1 * /P0 |
| EP04 = | /T1 * J3 * J2 * /J1 * /J0 * /P3 * /P2 * P1 * /P0 |
| EP05 = | /T0 * REQ * /J3 * /J2 * /J1 * J0 * /P3 * /P2 * P1 * /P0 |
| EP06 = | /T1 * /J3 * J2 * J1 * J0 * /P3 * /P2 * P1 * /P0 |
| EP07 = | /T1 * /J3 * /J2 * J1 * /J0 * /P3 * /P2 * P1 * /P0 |
| EP08 = | /T1 * /J3 * /J2 * /J1 * J0 * /P3 * /P2 * P1 * P0 |
| EP09 = | /T1 * DESTOK * /P3 * /P2 * P1 * P0 |
| EP10 = | /T0 * REPMAX * /P3 * /P2 * P1 * P0 |
| EP11 = | /T0 * TOUT * /P3 * /P2 * P1 * P0 |
| EP12 = | /T3 * DI * /P3 * P2 * /P1 * /P0 |
| EP13 = | /T1 * DESTOK * /PEMFIN * /P3 * P2 * /P1 * /P0 |
| EP14 = | /T1 * DESTOK * PEMFIN * /P3 * P2 * /P1 * /P0 |
| EP15 = | /T0 * TOUT * /P3 * P2 * /P1 * /P0 |
| EP16 = | /T3 * /J3 * /J2 * /J1 * J0 * /P3 * P2 * /P1 * P0 |
| EP17 = | /T3 * /J3 * /J2 * J1 * /J0 * /P3 * P2 * /P1 * P0 |
| EP18 = | /T3 * /J3 * /J2 * J1 * J0 * /P3 * P2 * /P1 * P0 |
| EP19 = | /T0 * TOUT * /P3 * P2 * /P1 * P0 |
| EP20 = | /T3 * /J3 * /J2 * /J1 * J0 * /P3 * P2 * P1 * /P0 |
| EP21 = | /T3 * /J3 * /J2 * J1 * /J0 * /P3 * P2 * P1 * /P0 |
| EP22 = | /T3 * /J3 * /J2 * J1 * J0 * /P3 * P2 * /P1 * /P0 |
| EP23 = | /T0 * TOUT * /P3 * P2 * P1 * /P0 |
| EP24 = | /T0 * /RLIB * REQ * /P3 * P2 * P1 * P0 |
| EP25 = | /T1 * /TOUT * /RLIB * DESTOK * /REQ * /P3 * P2 * P1 * P0 |
| EP26 = | /T1 * /TOUT * RLIB * /PRIM * J3 * /J2 * J1 * /J0 * /P3 * P2 * P1 * P0 |
| EP27 = | /T1 * /TOUT * RLIB * /PRIM * /J3 * /J2 * /J1 * J0 * /P3 * P2 * P1 * P0 |
| EP28 = | /T1 * /TOUT * RLIB * PRIM * /P3 * P2 * P1 * P0 |
| EP29 = | /T1 * /TOUT * /P3 * P2 * P1 * P0 |
| EP30 = | /T1 * /TOUT * /J3 * /J2 * J1 * J0 * P3 * /P2 * /P1 * /P0 |
| EP31 = | /T1 * /TOUT * J3 * /J2 * /J1 * J0 * P3 * /P2 * /P1 * /P0 |
| EP32 = | /T1 * TOUT * P3 * /P2 * /P1 * /P0 |

TABLE VIIb

Boolean equations of transmitter automaton 1105
Functions "Sums"

| | |
|---|---|
| N0E = | EP01+EP02+EP03+EP04+EP05+EP06+EP07+EP10+EP11+EP13+EP15+EP17+EP18 +EP19+EP20++EP21 +EP22+EP23+EP24+EP25 |
| N1E = | EP00+EP02+EP03+EP04+EP05 +EP06+EP10+EP11+EP14+EP15+EP17+EP18+EP19 +EP20+EP21+EP22+EP23+EP24+EP25+EP26+EP27+EP28+EP29+EP31+EP32 |
| N2E = | EP02+EP03+EP04+EP06+EP08+EP09+EP10+EP11+EP13+EP14+EP15+EP16+EP18+ +EP19+EP20+EP22+EP23+EP25 |
| N3E = | EP02+EP06+EP12+EP30 |

TABLE VIIb-continued
Boolean equations of transmitter automaton 1105
Functions "Sums"

| | |
|---|---|
| F0E = | EP05+EP14+EP16+EP17+EP21+EP21+EP27+EP28+EP29+EP31+EP32 |
| F1E = | EP14+EP17+EP20+EP21+EP25+EP26+EP29+EP32 |
| F2E = | EP05+E-+EP18+EP22+EP25 |
| F3E = | EP08+EP09+EP13+EP26+EP27+EP28+EP29+EP31+EP32 |
| F4E = | EP00+EP01+EP02+EP03+EP04+EP06+EP07+EP10+EP11+EP15+EP18+EP19+EP20+EP22+EP23+EP25+EP27+EP28+EP29+EP31+EP32 |
| F5E = | EP03+EP04+EP05+EP09+EP10+EP11+EP12+EP13+EP14+EP15+EP16+EP17+EP18+EP19+EP20+EP22+EP23+EP24+EP25+EP30 |

| IDENTIFICATION | | EVENT | INPUTS | | | | | | PRESENT COND. | | | | FOLW. COND. | | | DISPLAY | | | FUNCTION | | | |
|---|---|---|---|---|---|---|---|---|---|---|---|---|---|---|---|---|---|---|---|---|---|---|
| RP00 | 101 | LIBR | 0 | . | . | . | . | . | . | ER0 | 1 | . | . | ER0 | 1 | . | 1 | . | . | 1 | 0 | .EVEIL |
| RP01 | 103 | TAIL | 0 | . | . | . | . | . | . | ER0 | 1 | . | . | ER0 | 1 | . | 1 | 0 | . | 0 | 1 | .RTAIL |
| RP02 | 104 | ACTIV | 0 | . | . | . | . | . | . | ER0 | 1 | . | . | ER2 | 1 | . | 1 | . | . | . | . | |
| RP03 | 102 | DISC | 0 | . | . | . | . | . | . | ER0 | 1 | . | . | ER1 | 0 | . | 0 | . | . | . | . | |
| RP04 | 106 | TST | 0 | . | . | . | . | . | . | ER1 | 0 | . | . | ER1 | 1 | . | 1 | 1 | . | 1 | 1 | .RTST |
| RP05 | 105 | MES | 0 | . | . | . | . | . | . | ER1 | 0 | . | . | ER0 | 1 | . | 1 | 0 | . | 0 | 0 | |
| RP06 | 148 | DID 1.2.3 | 0 | . | . | . | . | 1 | 0 | ER2 | 0 | . | . | ER2 | 0 | . | 1 | 1 | . | 1 | 0 | .RDID |
| RP07 | 126 | PRND | 0 | . | . | . | . | 0 | 1 | ER2 | 0 | . | . | E3 | 0 | . | 0 | 1 | . | 1 | 0 | .RDID |
| RP08 | 139 | PRD | 0 | . | . | 1 | . | . | . | ER2 | 0 | . | . | R4 | 0 | . | 0 | 0 | . | 0 | 0 | .DIAL-SEC-PRD |
| RP09 | 143 | LIBR . REQ | 0 | . | . | . | . | . | . | ER2 | 0 | . | . | R6 | 0 | . | 0 | 1 | . | 0 | 1 | |
| RP10 | 145 | TAIL | 0 | . | . | . | . | . | . | ER2 | 0 | . | . | ER0 | 1 | . | 1 | 0 | . | 0 | 0 | .RTAIL |
| RP11 | 146 | DISC | 0 | . | . | . | . | . | . | ER2 | 0 | . | . | ER1 | 0 | . | 0 | 0 | . | 0 | 0 | |
| RP12 | 147 | DIFF | 0 | . | . | . | . | . | . | ER2 | 0 | . | . | ER2 | 0 | . | 0 | 1 | . | 1 | 0 | .RPDIF |
| RP13 | 127 | PAQ OK | 0 | 0 | 0 | . | . | . | . | R3 | . | 0 | 0 | R5 | 0 | . | 0 | 0 | . | 1 | 0 | .RR |
| RP14 | 128 | PAQ OK / | 0 | 0 | 1 | . | . | . | . | R3 | . | 0 | 0 | R5 | 0 | . | 0 | 0 | . | 1 | 0 | .REJ |
| RP15 | 129 | ENGORG | 0 | 1 | . | . | . | . | . | R3 | . | 0 | 0 | R6 | 1 | . | 1 | 0 | . | 0 | 1 | .RNR |
| RP16 | 136 | PAQ OK | 0 | 0 | 0 | . | . | . | . | R4 | . | 0 | 0 | R6 | 0 | . | 0 | 0 | . | 0 | 0 | .RRFIN |
| RP17 | 137 | PAQ OK / | 0 | 0 | 1 | . | . | . | . | R4 | . | 0 | 0 | R5 | 1 | . | 1 | 0 | . | 1 | 1 | .REJ |
| RP18 | 138 | ENGORG | 0 | 1 | . | . | . | . | . | R4 | . | 0 | 0 | R6 | 0 | . | 0 | 0 | . | 0 | 1 | .RNR |
| RP19 | 149 | PCRT | 0 | 0 | . | . | . | . | . | R5 | . | 0 | 1 | R3 | 0 | . | 0 | 1 | . | 1 | 0 | .RPCRT |
| RP20 | 131 | PFIN | 0 | 0 | . | . | . | . | . | R5 | . | 0 | 1 | R4 | 0 | . | 0 | 1 | . | 0 | 1 | .RPFIN |
| RP21 | 132 | TOUT | 0 | 1 | . | . | . | . | . | R6 | . | 1 | . | R6 | 0 | . | 0 | 0 | . | 0 | 0 | |
| RP22 | 133 | ELIB/. PCRT | 0 | 0 | 0 | . | . | . | . | R6 | . | 0 | . | R3 | 0 | . | 0 | 1 | . | 1 | 0 | .RPCRT |
| RP23 | 134 | ELIB/. PFIN | 0 | 0 | 0 | 1 | . | . | . | R6 | . | 0 | 0 | R4 | 0 | . | 0 | 0 | . | 0 | 1 | .RPFIN |
| RP24 | 141 | ELIB-SEC-PRES | 0 | 0 | 0 | 0 | . | . | . | R6 | . | 0 | 0 | ER2 | 0 | . | 0 | 0 | . | 0 | 0 | |
| RP25 | 140 | ELIB-SEC-LIBR | 0 | 0 | 0 | 0 | . | . | . | R6 | . | 0 | 0 | ER2 | 0 | . | 0 | 0 | . | 0 | 0 | |
| RP26 | 140 | ELIB-PRIM-TRSUI | 0 | 0 | 1 | . | . | . | . | R6 | . | 0 | 0 | ER2 | 0 | . | 0 | 1 | . | 0 | 0 | |
| RP27 | 142 | TOUT | 0 | . | . | . | . | . | . | R8 | 1 | . | . | R8 | 1 | . | 1 | 0 | . | 0 | 0 | |
| RP28 | 144 | ETDIF | 0 | . | 0 | . | . | . | . | R8 | 1 | . | . | ER2 | 0 | . | 0 | 0 | . | 0 | 0 | |
| RP29 | 123 | PFIN | 0 | . | 0 | . | . | . | . | R8 | . | 0 | . | ER2 | 0 | . | 0 | 0 | . | 0 | 0 | |
| RP30 | 122 | TOUT | 0 | . | 1 | . | . | . | . | . | . | 1 | 0 | ER2 | 0 | . | 0 | 0 | . | 0 | 0 | |

TABLE IXa

Boolean equations of receiver automaton 1106
Functions "Products"

RP00 = /T1.* /J3 * /J2 * /J1 * J0 * P3 * P2 * P1 * P0
RP01 = /T1 * /J3 * J2 * J1 * J0 * P3 * P2 * P1 * P0
RP02 = /T1 * /J3 * J2 * J1 * /J0 * P3 * P2 * P1 * P0
RP03 = /T1 * /J3 * /J2 * J1 * /J0 * P3 * P2 * P1 * P0
RP04 = /T1 * /J3 * J2 * /J1 * J0 * /P3 * /P2 * /P1 * P0
RP05 = /T1 * /J3 * J2 * /J1 * /J0 * /P3 * /P2 * /P1 * P0
RP06 = /T1 * J3 * /J2 * J1 * J0 * /P3 * /P2 * P1 * /P0
RP07 = /T1 * J3 * J2 * /J1 * J0 * /P3 * /P2 * P1 * /P0
RP08 = /T1 * J3 * J2 * /J1 * /J0 * /P3 * P2 * P1 * /P0
RP09 = /T1 * REQ * /J3 * /J2 * /J1 * J0 * /P3 * /P2 * P1 * /P0
RP10 = /T1 * /J3 * J2 * J1 * J0 * /P3 * /P2 * P1 * /P0
RP11 = /T1 * /J3 * /J2 * J1 * J0 * /P3 * /P2 * P1 * /P0
RP12 = /T1 * /J3 * /J2 * J1 * J0 * /P3 * /P2 * P1 * /P0
RP13 = /T2 * /ENGOR * POK * /P3 * /P2 * P1 * P0
RP14 = /T2 * /ENGOR * /POK * /P3 * /P2 * P1 * P0
RP15 = ENGOR * /P3 * /P2 * P1 * P0
RP16 = /T2 * /ENGOR * POK * /P3 * P2 * /P1 * /P0
RP17 = /T2 * /ENGOR * /POK * /P3 * P2 * /P1 * /P0
RP18 = /T2 * ENGOR * /P3 * P2 * /P1 * /P0
RP19 = /T1 * /TOUT * J3 * /J2 * /J1 * /J0 * /P3 * P2 * /P1 * P0
RP20 = /T1 * /TOUT * J3 * /J2 * /J1 * J0 * /P3 * P2 * /P1 * P0
RP21 = /T1 * TOUT * /P3 * P2 * /P1 * P0
RP22 = /T1 * /TOUT * /ELIB * J3 * /J2 * /J1 * /J0 * /P3 * P2 * P1 * /P0
RP23 = /T1 * /TOUT * /ELIB * J3 * /J2 * /J1 * J0 * /P3 * P2 * P1 * /P0
RP24 = /T1 * /TOUT * ELIB * /PRIM * J3 * /J2 * J1 * /J0 * /P3 * P2 * P1 * /P0
RP25 = /T1 * /TOUT * ELIB * /PRIM * /J3 * /J2 * /J1 * J0 * /P3 * P2 * P1 * /P0
RP26 = /T1 * /TOUT * ELIB * PRIM * /P3 * P2 * P1 * /P0
RP27 = /T1 * TOUT * /P3 * P2 * P1 * /P0
RP28 = /T2 * DIF * /P3 * P2 * P1 * /P0
RP29 = /T1 * /TOUT * J3 * /J2 * /J1 * J0 * P3 * /P2 * /P1 * /P0
RP30 = /T1 * /TOUT * P3 * /P2 * /P1 * /P0

TABLE IXb

Boolean equations of receiver automaton 1106
Functions "Sums"

NOR = RP00+RP01+RP03+RP04+RP05+RP07+RP10+RP11+RP13+RP14+RP17+RP19+RP22
N1R = RP00+RP01+RP02+RP05+RP06+RP07+RP09+RP10+RP12+RP15+RP16+RP18+RP19+RP21+RP22+RP24+RP25+RP26+RP27+RP29+RP30
N2R = RP00+RP01+RP05+RP08+RP09+RP10+RP13+RP14+RP15+RP16+RP17+RP18+RP20+RP21+RP23
N3R = RP00+RP01+RP05+RP10+RP28
F0R = RP01+RP04+RP07+RP10+RP12+RP13+RP14+RP17 RP19+RP22
F1R = RP00+RP04+RP08+RP14+RP16+RP17+RP19+RP22
F2R = RP00+RP01+RP04+RP10+RP12+RP15+RP18+RP20+RP23+
F3R = RP06+RP07+RP08+RP12+RP19+RP20+RP22+RP23
F4R = RP00+RP01+RP02+RP03+RP04+RP05+RP06+RP09+RP10+RP11+RP12+RP15+RP16 RP18+RP21+RP24+RP25+RP26+RP27+RP29+RP30

The parallel output of the series-to-parallel converter 1405 is connected to the input of a selecting circuit 1409 which selects the information to be relooped modulo frame or modulo multiframe. The circuit 1409 is controlled in function of the contents of the connection memory of the data transmitted in circuit mode.

One output 1410 of the selecting circuit 1409 is connected to the data input of a silo memory 1411 in which are stored the data to be relooped modulo frame, the output 1412 being connected to the input of a silo memory 1413 in which are stored the data to be relooped modulo multiframe.

Also, the looper 1401 comprises a master bit clock 1426 controlling a second time base 1414 which comprises a byte counter 1415 and a frame order decoding circuit 1416.

The clock input of the silo memory or FiFo memory 1411 is connected to the output of a multiplexer 1417 of which one input is connected from the output of an AND gate 1418, its other input being connected from the output of an AND gate 1419. One input of the AND gate 1418 is connected to the output of the counter 1407, the other input being connected to the output of the master clock 1426. The AND gate 1419 has one input connected from the output of the counter 1415, its other input being connected from the output of the master clock 1426.

The clock input of the multiframe memory 1413 is connected to the output of a multiplexer 1420 of which one input is connected to the output of a AND gate 1421, the other input being connected to the output of a AND gate 1422. One input of the AND gate 1421 is connected from the output of the decoder 1408, the other input being connected from the output of the master clock 1426.

The data output of the memory 1411 is connected to a multiplexer 1423, on one hand, and, on the other hand, to a supervising circuit 1424 which, for each frame, supervises the token byte, and possibly regenerates it. The clock input of the circuit 1424 is connected from the counter 1415. The output of the circuit 1424 is connected to one input of the multiplexer 1423.

The data input of the memory 1413 is connected to one input of the multiplexer 1423. At last, one input of the multiplexer 1423 is also connected from the master clock 1426.

The output of the multiplexer 1423 is connected to the parallel input of a parallel-to-series converter 1425 of which the series output is connected to the input of the unit 1400. In practice, and if the circuits 1400 can be mounted on a single printed circuit board, the converter 1425 may be omitted as well as the converter 405 and the time base 403 in the unit 1400, the time base 403 being replaced by the time base 1414.

Thus, the subframe data (STP and STCT) are stored in the memory 1411 and the subframe data (STCD) are stored in the memory 1413, via the looper 1401. In fact, for each frame, the data of the first two subframes must be repeated as they enter the coupler as for their contents while the others may be stored for the time of a multiframe before being reinserted.

The memories 1411 and 1412 are read out at the rythm of the master clock 1426 of which the function is to restore the synchronization whatever be the duration of the transmission through the loop. In practice, the clock 1426 may be triplicated and associated with a conventional majority decision circuit.

In the unit 1400, each token byte is transmitted to the receiving automaton wherein it is analysed for detecting if it contains the token contents or their complement. In the first case, the new transmitted token is the complement of the first. In the second case, the packet is erased and a token LIBRE is transmitted.

At last, the connection memory is updated by the microprocessor of the unit 1400.

What is claimed is:

1. A hybrid local communication network operating both in circuit and packet modes with a loop carrying a TDM multiplex for interconnecting a number of terminals connected to the loop, the communications in packet mode being controlled by a token byte, the header for each packet comprising the address of the called station and the address of the calling station, wherein the TDM multiplex is arranged in multiframes comprising N frames $\phi$-(N−1), each frame comprising P byte time slots iT$\phi$-iT(P−1) for transmitting a packet per frame, the byte time slot iT$\phi$ in each frame containing the frame alignment pattern of the frame, the byte time slot iT1 containing the frame packet token byte, the byte time slots IT2-iTh containing the packet header, the byte time slots iT(h+1)-iTx (where x generally indicates any suitable number) containing the useful data of said packet, and the byte time slot iT(x+1)-iT(P−1) containing circuit type communication data.

2. A hybrid local communication network according to claim 1, further comprising cluster control units, each acting as interface circuits between a cluster of different types of terminals and the loop, and a loop control unit, the service and supervision messages between any one of the cluster control units, on one hand, and the loop control unit, on the other hand, being exchanged in packet mode.

3. A hybrid local communication network according to claim 2, wherein the digital value of x may be changed by the loop control unit which then transmits the value of x in packet mode to every operative cluster control unit.

4. A hybrid local communication network according to claim 3, wherein the consecutive frames in a dialogue in packet mode between two control units are used in alternance by those control units involved in the dialogue, the time interval iTx of each frame being allotted to the acknowledgement transmitted by one control unit to the other control unit relating to the packet the one control unit received in the preceding frame.

5. A hybrid local communication network according to claim 2, wherein the consecutive frames in a dialogue in packet mode between two control units are used in alternance by those control units involved in the dialogue, the time interval iTx of each frame being allotted to the acknowledge transmitted by one control unit to the other control unit relating to the packet the one control unit received in the preceding frame.

6. A hybrid local communication network according to claim 5, wherein each cluster control unit becoming operative in the loop transmits a message in packet mode relating to its operative condition to the loop control unit which in turn transmits in packet mode to the newly operative cluster control unit, a message containing the digital value of x and other service parameters, if any.

7. A hybrid local communication network according to claim 5, wherein each cluster control unit operative in the loop may receive a message in packet mode from the loop control unit asking the cluster control unit to release from the loop operation, when the loop control unit has founded it faulty.

8. A hybrid local communication network according to claim 5, wherein every packet to be transmitted with a length which is longer than the number of bytes available in each frame, including the header byte, the acknowledgment and CRC bytes, is divided into segments which are compatible with said number, a time byte slot following the header being alloted to the numbering of the transmitted segments, the header token byte indicating that the following segment is either a first segment, or a current segment, or a last segment, or a first and last segment.

9. A hybrid local communication network according to claim 5, wherein the number of segments transmitted by one unit in the course of a dialogue is limited to a predetermined value.

10. A hybrid local communication network according to claim 7, wherein the message in packet mode delivered from the loop control unit to the apparently faulty cluster control unit may include a command to turn to a self test condition.

11. A hybrid local communication network according to claim 10, wherein every packet to be transmitted with a length which is longer than the number of bytes available for each frame, including the header byte, the acknowledgment and CRC bytes, is divided into segments which are compatible with said number, a time byte slot following the header being allotted to the numbering of the transmitted segments, the header token byte indicating that the following segment is either a first segment, or a current segment, or a last segment, or a first and last segment.

12. A hybrid local communication network according to claim 7, wherein every packet to be transmitted with a length which is longer than the number of bytes available in each frame, including the header byte, the acknowledgment and CRC bytes, is divided into segments which are compatible with said number, a time byte slot following the header being allotted to the numbering of the transmitted segments, the header token byte indicating that the following segment is either a first segment, or a current segment, or a last segment, or a first and last segment.

13. A hybrid local communication network according to claim 7, wherein the number of segments transmitted by one unit in the course of a dialogue is limited to a predetermined value.

14. A hybrid local communication network according to claim 10, wherein the number of segments transmitted by one unit in the course of a dialogue is limited to a predetermined value.

15. A hybrid local communication network according to claim 4, wherein every packet to be transmitted with a length which is longer than the number of bytes available in each frame, including the header byte, the acknowledgment and CRC bytes, is divided into segments which are compatible with said number, a time byte slot following the header being allotted to the numbering of the transmitted segments, the header token byte indicating that the following segment is either a first segment, or a current (neither first, nor last) segment, or a last segment, or a first and last (unique) segment.

16. A hybrid local communication network according to claim 6, wherein the number of segments transmitted by one unit in the course of a dialogue is limited to a predetermined value.

17. A hybrid local communication network according to claim 6, wherein each cluster control unit operative in the loop may receive a message in packet mode from the loop control unit asking the cluster control unit to release from the loop operation, when the loop control unit has founded it faulty.

18. A hybrid local communication network according to claim 2, wherein every packet to be transmitted with a length which is longer than the number of bytes available in each frame, including the header byte, the acknowledgment and CRC bytes, is divided into segments which are compatible with said number, a time byte slot following the header being allotted to the numbering of the transmitted segments, the header token byte indicating that the following segment is either a first segment, or a current (neither first, nor last) segment, or a last segment, or a first and last (unique) segment.

19. A hybrid local communication network according to claim 2, wherein the number of segments transmitted by one unit in the course of a dialogue is limited to a predetermined value.

20. A hybrid local communication network according to claim 3, wherein the number of segments transmitted by one unit in the course of a dialogue is limited to a predetermined value.

21. A hybrid local communication network according to claim 3, wherein every packet to be transmitted with a length which is longer than the number of bytes available in each frame, including the header byte, the acknowledgment and CRC bytes, is divided into segments which are compatible with said number, a time byte slot following the header being allotted to the numbering of the transmitted segments, the header token byte indicating that the following segment is either a first segment, or a current (neither first, nor last) segment, or a last segment, or a first and last (unique) segment.

22. A hybrid local communication network according to claim 1, wherein any cluster control unit or loop control unit comprises, connected to the loop, on the ingoing side, a time base circuit, a circuit type data processing circuit and a series-to-parallel converter, and on the outgoing side, a multiplexer whose one input is connected from said circuit type data processing circuit and the other input is connected to the output of a parallel-to-series converter, the output of the series-to-parallel converter is connected to the input of a 1-byte delay shift register whose output is connected to the series input of the parallel-to-series converter, the parallel output of the series-to-parallel converter being connected to a reception bus to which a header decoder, a data packet receiver circuit, a control circuit receiving the packet token and a data packet transmitter circuit are applied, the parallel input of the parallel-to-series converter being connected to a transmission bus to which the header decoder, the data packet receiver circuit, the control circuit, the data packet transmitter circuit and a header generator are coupled, said data packet receiver circuit and data packet transmitter circuit being coupled to a microprocessor being itself connected to the terminals served by the cluster control unit, the control circuit being connected to the header decoder, the data packet receiver circuit and the data packet transmitter circuit through individual conductors transmitting event and condition information, and the control circuit operating as a sequencer.

23. A hybrid local communication network according to claim 22, wherein the header decoder circuit comprises an addressee unit identity comparator circuit whose output is connected to a corresponding input of the control circuit through a wire set at "1" when the own identity of the unit has been recognized and an addressing unit identity comparator circuit whose output is connected to the control circuit through a wire set at "1" when the identity of the other unit which the unit communicates with has been recognized, and a positive acknowledgment detector whose output is connected to the control circuit through a wire set at "1" when a positive acknowledgement has been detected.

24. A hybrid local communication network according to claim 22, wherein the data packet receiver circuit comprises a RAM memory whose data input is coupled to the reception bus (BUS REC), data output is coupled to the data bus (BUS DON) and write address input is connected from the output of a counter whose input is connected from the output of a packet beginning address register, the output of said packet beginning address register being also connected to the input of a FiFo memory whose output is connected to the data bus (BUS DON), the output of said counter being also connected to the input of packet beginning address register, the RAM memory having a read-out address input connected from the address bus (BUS ADR), the packet beginning address register having a control input connected from the control circuit through a wire transmitting the information of confirmed acknowledgment, the counter having a control input connected from the control circuit through a wire (REJ) transmitting the information of rejection of the last received packet, and the FiFo memory being connected to the control circuit through three wires (RR, RRFIN, RNR) respectively transmitting information confirming either good or faulty reception of the last received packet.

25. A hybrid local communication network according to claim 22, wherein the data packet transmitter circuit comprises a RAM memory whose data input is connected from the data bus (BUS DON), data output is connected to the transmission bus (BUS EMIS) and address input is connected, on the one hand, from the address bus (BUS ADR) and, on the other hand, from the output of a transmitted byte counter, the said RAM memory being arranged in a plurality of areas, each area being able to store an entire packet ready to be transmitted to another unit and being associated to an area condition register and a pointer RAM memory, the data input of the area condition register being connected from the output of a first switch and the address input of the area condition register being connected, on the one hand, from the address bus (BUS ADR) and, on the other hand, from an area beginning register, the pointer RAM memory having its data input connected from the output of a second switch, its address input connected from the address bus (BUS ADR), the output of a FiFo memory and the output of an address reception register connected from the reception bus (BUS REC) to store the address of the other party, and its data output connected to the input of the area beginning register and the input of the transmitted byte counter, the input of the FiFo memory being connected from the data bus (BUS DON), the output of the transmitted byte counter being also connected to a first buffer register whose output is connected to the input of a second buffer register whose output is selectively switchable to the input of the transmitted byte counter, the second buffer register having a control input connected from the control circuit through a wire (REJ) transmitting the information confirming the acknowledgment of the segment which had been transmitted in the last but one frame.

26. A hybrid local communication network according to claim 23, wherein the data packet receiver circuit comprises a RAM memory whose data input is coupled to the reception bus (BUS REC), data output is coupled to the data bus (BUS DON) and write address input is connected from the output of a counter whose input is connected from the output of a packet beginning address register, the output of said packet beginning address register being also connected to the input of a FiFo memory whose output is connected to the data bus (BUS DON), the output of said counter being also connected to the input of packet beginning address register, the RAM memory having a read-out address input connected from the address bus (BUS ADR), the packet beginning address register having a control input connected from the control circuit through a wire transmitting the information of confirmed acknowledgment, the counter having a control input connected from the control circuit through a wire (REJ) transmitting the information of rejection of the last received packet, and the FiFo memory being connected to the control circuit through three wires (RR, RRFIN, RNR) respectively transmitting information confirming either good or faulty reception of the last received packet.

27. A hybrid local communication network according to claim 23, wherein the data packet transmitter circuit comprises a RAM memory whose data input is connected from the data bus (BUS DON), data output is connected to the transmission bus (BUS EMIS) and address input is connected, on the one hand, from the address bus (BUS ADR) and, on the other hand, from the output of a transmitted byte counter, the said RAM memory being arranged in a plurality of areas, each area being able to store an entire packet ready to be transmitted to another unit and being associated to an area condition register and a pointer RAM memory, the data input of the area condition register being connected from the output of a first switch and the address input of the area condition register being connected, on the one hand, from the address bus (BUS ADR) and, on the other hand, from an area beginning register, the pointer RAM memory having its data input connected from the output of a second switch, its address input connected from the address bus (BUS ADR), the output of a FiFo memory and the output of an address reception register connected from the reception bus (BUS REC) to store the address of the other party, and its data output connected to the input of the area beginning register and the input of the transmitted byte counter, the input of the FiFo memory being connected from the data bus (BUS DON), the output of the transmitted byte counter being also connected to a first buffer register whose output is connected to the input of a second buffer register whose output is selectively switchable to the input of the transmitted byte counter, the second buffer register having a control input connected from the control circuit through a wire (REJ) transmitting the information confirming the acknowledgment of the segment which had been transmitted in the last but one frame.

28. A hybrid local communication network according to claim 23, wherein the control circuit comprises an input converter, a receiver automaton and a transmitted automaton, all made of PAL type circuits.

29. A hybrid local communication network according to claim 24, wherein the data packet transmitter circuit comprises a RAM memory whose data input is connected from the data bus (BUS DON), data output is connected to the transmission bus (BUS EMIS) and address input is connected, on the one hand, from the address bus (BUS ADR) and, on the other hand, from the output of a transmitted byte counter, the said RAM memory being arranged in a plurality of areas, each area being able to store an entire packet ready to be transmitted to another unit and being associated to an area condition register and a pointer RAM memory, the data input of the area condition register being connected from the output of a first switch and the address input of the area condition register being connected, on the one hand, from the address bus (BUS ADR) and, on the other hand, from an area beginning register, the pointer RAM memory having its data input connected from the output of a second switch, its address input connected from the address bus (BUS ADR), the output of a FiFo memory and the output of an address reception register connected from the reception bus (BUS REC) to store the address of the other party, and its data output connected to the input of the area beginning register and the input of the transmitted byte counter, the input of the FiFo memory being connected from the data bus (BUS DON), the output of the transmitted byte counter being also connected to a first buffer register whose output is connected to the input of a second buffer register whose output is selectively switchable to the input of the transmitted byte counter, the second buffer register having a control input connected from the control circuit through a wire (REJ) transmitting the information confirming the acknowledgment of the segment which had been transmitted in the last but one frame.

30. A hybrid local communication network according to claim 24, wherein the control circuit comprises an input converter, a receiver automaton and a transmitted automaton, all made of PAL type circuits.

31. A hybrid local communication network according to claim 25, wherein the control circuit comprises an input converter, a receiver automaton and a transmitted automaton, all made of PAL type circuits.

32. A hybrid local communication network according to claim 1, wherein every packet to be transmitted with a length which is longer than the number of bytes available in each frame, including the header byte, the acknowledgment and CRC bytes, is divided into segments which are compatible with said number, a time byte slot following the header being allotted to the numbering of the transmitted segments, the header token byte indicating that the following segment is either a first segment, or a current (neither first, nor last) segment, or a last segment, or a first and last (unique) segment.

33. A hybrid local communication network according to claim 32, wherein either any cluster control unit or loop control unit receiving a segment from another unit substitutes for the received segment a segment possibly containing an information ready to be transmitted to said other unit, that information including at least an acknowledgment regarding the segment received in the preceding frame.

34. A hybrid local communication network according to claim 32 wherein, once the last segment of a packet has been transmitted and having possibly received the correct acknowledgment from the other unit, the unit tranmits on the loop a packet including only an idle token, the next unit receiving the idle token and having a packet ready to be transmitted to any other unit substitutes for the idle token a first segment or a first and last segment to initiate a new packet communication, said unit transmitting at the end of the dialogue with said other unit a packet including an idle token.

35. A hybrid local communication network according to claim 32, wherein the number of segments transmitted by one unit in the course of a dialogue is limited to a predetermined value.

36. A hybrid local communication network according to claim 34, wherein the number of segments transmitted by one unit in the course of a dialogue is limited to a predetermined value.

37. A hybrid local communication network according to claim 33 wherein, once the last segment of a packet has been transmitted and having possibly received the correct acknowledgment from the other unit, the unit transmits on the loop a packet including only an idle token, the next unit receiving the idle token and having a packet ready to be transmitted to any other unit substitutes for the idle token a first segment or a first and last segment to initiate a new packet communication, said unit transmitting at the end of the dialogue with said other unit a packet including an idle token.

38. A hybrid local communication network according to claim 33, wherein the number of segments transmitted by one unit in the course of a dialogue is limited to a predetermined value.

39. A hybrid local communication network according to claim 33, wherein a first token is used to indicate that a unit has no more segment of a packet to send and a second token called an idle token is sent only by the unit having initiated the packet communication once it has sent a segment containing a first token, then received a segment containing a first token and if it has received a correct acknowledgment of the last segment it has transmitted.

40. A hybrid local communication network according to claim 1, wherein the number of segments transmitted by one unit in the course of a dialogue is limited to a predetermined value.

41. A hybrid local communication network according to claim 22, wherein the control circuit comprises an input converter, a receiver automaton and a transmitted automaton, all made of PAL type circuits.

42. A hybrid local communication network according to claim 1, wherein the loop control unit comprises a cluster control means and a looper means, the input of said looper means being connected to one end of the loop and its output being connected to the input of said cluster control means, the output of said cluster control means being connected to the other end of the loop, a data line and a clock line connected to the input of the looper means, a slave clock circuit for providing a first time base connected to the input of said slave time base circuit, a first byte counter which comprises a synchronizing automaton, a first frame counter, a series-to-parallel converter, a selecting circuit, the data line being connected to said series-to-parallel converter, a circuit mode connection memory, the parallel outputs of said series-to-parallel converter being connected to said selecting circuit for making a selection of the information which is to be relooped in a modulo frame or modulo multiframe in response to the contents of the circuit mode connection memory, first and second FiFo memory means each having a clock input, one output of the selecting circuit being connected to said first FiFo memory and another output of said selecting circuit being connected to the input of said second FiFo memory, the looper means comprising a master clock circuit for providing a second time base circuut comprising a second byte counter means and a second frame counter means, a first multiplexer means having one input connected to receive clock signals from the slave clock and another input connected to receive clock signals from the master clock, logic means for controlling the two inputs of said first multiplexer means, the output of said first multiplexer means being connected to the clock input of said first FiFo memory means, first and second frame counter means, a second multiplexer means having one input connected to receive signals from the first frame counter and another input connected to receive signals from said second frame counter, said second multiplexer means having an output connected to the clock input of said second FiFo memory, a token supervision circuit having a data and a clock input, logic control means for controlling the two inputs of the second multiplexer means, a third multiplexer means having four inputs respectively connected to receive clock signals from said master clock, said first FiFo memory, said second FiFo memory and from said token supervision circuit, the data input of said token supervision circuit being connected to the output of said first FiFo memory and the clock input of said token supervision circuit being connected to said second byte counter, a third multiplexer, a second series-to-parallel converter, the output of said third multiplexer being connected to said second parallel-to-series converter whose output is connected to the input of said cluster control unit.

* * * * *